United States Patent
Zhou et al.

(10) Patent No.: US 8,063,356 B1
(45) Date of Patent: Nov. 22, 2011

(54) METHOD OF EXTRACTING FORMATION DENSITY AND PE USING A PULSED ACCELERATOR BASED LITHO-DENSITY TOOL

(75) Inventors: Tong Zhou, Quincy, MA (US); Felix Chen, Newtown, CT (US); Charles R. Case, West Redding, CT (US); Darwin V. Ellis, Ridgefield, CT (US); Bradley Albert Roscoe, Ridgefield, CT (US)

(73) Assignee: Schlumberger Technology Corporation, Cambridge, MA (US)

( * ) Notice: Subject to any disclaimer, the term of this patent is extended or adjusted under 35 U.S.C. 154(b) by 1004 days.

(21) Appl. No.: 11/962,161

(22) Filed: Dec. 21, 2007

(51) Int. Cl.
*G01V 5/06* (2006.01)

(52) U.S. Cl. .................................. 250/269.3

(58) Field of Classification Search .......... 250/253–268, 250/269.1–269.8
See application file for complete search history.

(56) References Cited

U.S. PATENT DOCUMENTS

| | | | |
|---|---|---|---|
| 3,321,625 A | 5/1967 | Wahl | |
| 3,654,470 A | 4/1972 | Wilson | |
| 3,975,689 A | 8/1976 | Geizer et al. | |
| 3,996,473 A | 12/1976 | Culver | |
| 4,394,574 A * | 7/1983 | Grau et al. | 250/262 |
| 4,577,156 A | 3/1986 | Kerst | |
| 4,823,044 A | 4/1989 | Falce | |
| 5,019,708 A * | 5/1991 | Flaum | 250/264 |
| 5,077,530 A | 12/1991 | Chen | |
| 5,122,662 A | 6/1992 | Chen et al. | |
| 5,293,410 A | 3/1994 | Chen et al. | |
| 5,319,314 A | 6/1994 | Chen | |
| 5,426,409 A | 6/1995 | Johnson | |
| 5,525,797 A | 6/1996 | Moake | |
| 5,745,536 A | 4/1998 | Brainard et al. | |
| 5,804,820 A | 9/1998 | Evans et al. | |
| 5,912,460 A | 6/1999 | Stoller et al. | |
| 6,121,850 A | 9/2000 | Ghoshal | |
| 6,201,851 B1 | 3/2001 | Piestrup et al. | |
| 6,441,569 B1 | 8/2002 | Janzow | |
| 6,713,976 B1 | 3/2004 | Zumoto et al. | |
| 6,925,137 B1 | 8/2005 | Forman | |
| 7,148,613 B2 | 12/2006 | Dally et al. | |
| 2006/0261759 A1 | 11/2006 | Chen et al. | |
| 2007/0040110 A1 * | 2/2007 | Ellis et al. | 250/266 |

OTHER PUBLICATIONS

Ellis et al., Well Logging for Earth Scientists, Springer, 2nd edition, 2007, pp. 345-379.

* cited by examiner

*Primary Examiner* — Kiho Kim
(74) *Attorney, Agent, or Firm* — Rachel Greene; Brigid Laffey

(57) ABSTRACT

A more precise determination of bulk formation density is attainable using a pulsed γ-γ density tool and simultaneously compensating for interactions due to photoelectric effect and density variations caused by standoff. A source directs energetic particles at a formation having a known photoelectric factor and electron density. One or more photons either emitted or deflected from the formation are captured at a first or second detector, respectively spaced at first and second distances from the source, and separated from each other by a third distance. First and second total energies of the photons respectively striking the first and second detectors are measured during a time interval. A first filter is disposed between the first detector and formation effective to cause Pe response to match standoff influence, thereby compensating for both effects simultaneously. In some embodiments, a second filter is provided between the second detector and formation.

46 Claims, 13 Drawing Sheets

METHOD OF EXTRACTING FORMATION DENSITY AND PE USING A PULSED ACCELERATOR BASED LITHO-DENSITY TOOL

BACKGROUND OF THE INVENTION

1. Field of the Invention

This invention generally relates to a method for a pulsed gamma-gamma density tool to simultaneously compensate for interactions due to the photoelectric effect and density variations caused by standoff, thereby enabling a more precise determination of bulk formation density. Also disclosed a compensated tool utilizing a betatron as a Bremsstrahlung source.

2. Background of the Invention

In the oil well industry, reservoir characterization is used to predict the location of oil-bearing and gas-bearing formations, estimate the producibility of these formations, and assess the quantity of hydrocarbon in the reservoir.

A basic parameter for reservoir characterization is bulk formation density. There are many methods to determine bulk formation density. One widely accepted method is gamma-gamma ($\gamma$-$\gamma$) density. Gamma rays are packets of electromagnetic radiation, also referred to as photons. A $\gamma$-$\gamma$ density sonde has a radioactive source, such as $Cs^{137}$, that emits gamma rays which are photons of energy at 662 keV, and two or more detectors located at various spacings from the radioactive source that count the number of photons that strike that detector as a function of time or energy. Typically, there is a short space (SS) detector located close to the radiation source and a long space (LS) detector further away from the radiation source. The SS detector generally has a shallower depth of investigation than the LS detector and is more sensitive to borehole fluid or mud cake between the sonde and the formation. The space between the sonde and the formation is called the standoff which normally filled up with borehole fluid, drilling fluid or mud cake. The LS detector has a deeper depth of investigation and is less sensitive to the borehole environment and more sensitive to the formation.

Both the radioactive source and the detectors are usually collimated and shielded to enhance the formation signals and to suppress borehole and tool housing signals. The geometry of the sonde mandates that a scoring photon (a photon striking a detector) must have interacted with at least one scattering electron before reaching a detector.

Two types of gamma ray interactions with earth formations dominate within the photon energy range of interest (from less than 100 keV to a few MeV). They are the photoelectric absorption (Pe) and Compton scattering. The probability of the type of interaction depends on the atomic number of the formation material and the energy of the gamma ray. For most earth formations, the photoelectric effect is dominant for gamma ray energies below about 100 keV. The photoelectric effect results from interaction of a gamma ray with an atom of the formation material. The incident gamma ray disappears and transfers its energy to a bound electron. The electron is ejected from the atom and replaced with another, less tightly bound, electron with the accompanying emission of a characteristic fluorescence x-ray with an energy dependent of the atomic number of the formation material.

The cross section for the photoelectric absorption, $\sigma_{Pe}$ varies strongly with the energy, falling off as nearly the cube of the gamma ray energy ($E_\gamma$). $\sigma_{Pe}$ is also highly dependent on the atomic number (Z) of the absorbing medium. For gamma rays with energies between 40 and 80 keV, the cross section per atom of atomic number Z is given by:

$$\sigma_{Pe} \approx Z^{4.6}/E_\gamma^{3.15} \qquad \text{(Eq. 1)}$$

Since Pe is very sensitive to the average atomic number of the formation medium, it can be used to obtain a direct measurement of lithology or rock type. This is because the principal rock matrices (such as sandstone, limestone and dolomite) have different atomic numbers and considerably different Pe absorption characteristics. Liquids filling pores in the formation medium have only a minor effect of Pe due to the low average atomic number of the liquids.

The presence of high Z elements along the photon transport path, such as is encountered in barite mud, has a significant impact on the detected signal strength and low energy photons are affected more than the high energy photons. Even photons at the highest energy, i.e. >500 keV, are not entirely immune to the photoelectric effect. A formation's photoelectric absorption influence on the measurement is characterized by its photoelectric factor (PEF). To obtain an accurate density measurement, it is necessary to know the formation's PEF. Although the Pe effect complicates density measurements, it does provide valuable information about the formation lithology.

Measuring a formation's PEF with a chemical radioactive source is not difficult. The source emits continuously, the average detector count rate is not very high and the density detector usually operates in a photon counting mode. In this mode, the detector records not just the total photon scores, but also the energies of individual scoring photons. By comparing the photon scores in different energy windows, it is possible to extract both PEF and density accurately.

At higher gamma ray energies, the dominant interaction is Compton scattering that involves interactions of gamma rays and individual electrons. A portion of the gamma ray energy is imparted to an electron and the remaining gamma ray is of reduced energy. A gamma ray of incident energy $E^0$ interacts with an electron of the formation material, scatters at an angle $\theta$, and leaves with an energy $E'$. The attenuation of gamma rays due to Compton scattering is a function of the bulk density ($\rho_b$) and the ratio of atomic number to atomic mass (Z/A). Z/A is approximately 0.5 for most formation materials of interest, so the bulk density may be calculated from:

$$\Sigma_{Co} = \sigma_{Co}(N_{AV}/A)(\sigma_b)(Z) \qquad \text{(Eq. 2)}$$

where $\Sigma_{Co}$ is the macroscopic cross section, $\sigma_{Co}$ is the Compton cross section and $N_{AV}$ is the average number of scoring photons at the detector.

Conventional $\gamma$-$\gamma$ density tools have a significant drawback. They require a chemical radioactive source, that is difficult to dispose and hazardous if misused. There is a move to replace chemical radioactive sources with electronic sources. An electronic source produces photons by accelerating an electron beam to a suitable high energy and impinging the beam on a target. Two types of electronic sources are DC electrostatic accelerators and pulsed accelerators. A pulsed machine may employ a variety of means to achieve a high beam energy, for example, a betatron utilizes a changing magnetic field to accelerate electrons which are then impinged on a target to generate Bremsstrahlung photons with a continuous energy spectrum from 0 up to the electron beam energy. Typically, pulsed machines have a low duty cycle and the photons are produced in short bursts of a few microseconds or less. To achieve adequate statistics, the source must deliver on average, many scoring photons per burst. Since those photons arrive at the detector at nearly the same instant, they are indistinguishable from each other. For such machines, the detector operates in an energy deposition mode, the detectors only record the total energy deposited in one burst. Since the photon energy distribution information is not available, other mechanisms are required to separate PEF and density information embedded in the signals.

Extracting PEF and density information requires separating low energy photons from high energy photons. One simple approach is to use a low energy filter to cut off photons below a threshold energy. For example, U.S. Pat. No. 3,321,625 to Wahl discloses that the Pe effect is dominant when the photon energy is less than 50 keV and placing a silver or cadmium disc in front of the detectors will absorb photons with energies less than 50 keV thereby minimizing the Pe effect. However, the 50 keV is a statistical average and the detected signals are still affected by PEF albeit to a lesser degree. Using filters to completely remove photons below a certain threshold comes with a penalty, namely, many high energy photons that carry density information are also lost. Consequently, using filters to reduce the Pe effect does not meet the precision requirements of modern logging.

Another approach is to use a laminated detector. In one embodiment, the detector consists of two different scintillators, a low density "semi-transparent" scintillator facing the formation and a high density "absorbing" detector in the back. In theory, the low density scintillator absorbs mainly low energy photons and allow most high energy flux to transmit through to the rear detector. In practice, a significant amount of high energy flux is also absorbed by the low density scintillator rendering the technique less sensitive than desired.

There remains a need for a method and apparatus to compensate for PEF in a pulsed electronic accelerator, such as a betatron that maximizes the information that may be extracted from scoring photons and retains high sensitivity without sacrificing precision.

SUMMARY OF THE INVENTION

According to an embodiment of the invention, the invention includes a method for a pulsed gamma-gamma density tool to simultaneously compensate for interactions due to the photoelectric effect and density variations caused by standoff, thereby enabling a more precise determination of bulk formation density. Also disclosed is a compensated tool utilizing a betatron as a Bremsstrahlung source. This method includes the steps of providing a source of energetic particles and directing those energetic particles at a formation having a known photoelectric factor and electron density and capturing one or more photons either emitted or deflected from the formation in either a first detector or a second detector. The first detector is spaced a first distance from the source, the second detector is spaced a second distance from the detector and a third distance separates the first detector from the second detector. Measuring a first total energy of the photons recorded by the first detector during a time interval and measuring a second total energy of the photons recorded by the second detector during the said time interval and disposing a first filter between the first detector and the formation effective to cause Pe response to match standoff influence thereby compensating for both effects simultaneously. In addition to the first filter, the required compensation may include a second filter between the second detector and the formation as well as adjustments to the respective first distance, second distance and third distance.

According to an aspect of the invention, the invention includes a compensated γ-γ density tool having a tool housing that defines an interior volume. Within this interior volume are a source of energetic particles having a duty cycle, a first photon detector and a second photon detector. The first photon detector is spaced a first distance from the source and the second detector spaced a second distance from said source and also paced a third distance from the first detector with the first distance being less than the second distance. A first filter is disposed between the first detector and a formation to be evaluated. A Pe sensitivity effect is about equal to a standoff density effect due to a combination that includes the first filter thickness, the first filter composition, the first distance, the second distance and/or the third distance.

Still further, there is disclosed methods to identify total energy pulses most likely to contain the energy of a single photon. The energy level of such a pulse provides useful information about the formation composition.

Further features and advantages of the invention will become more readily apparent from the following detailed description when taken in conjunction with the accompanying Drawings.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE PREFERRED EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice. Further, like reference numbers and designations in the various drawings indicated like elements.

According to an embodiment of the invention, the invention includes a method for a pulsed gamma-gamma density tool to simultaneously compensate for interactions due to the photoelectric effect and density variations caused by standoff, thereby enabling a more precise determination of bulk formation density. Also disclosed is a compensated tool utilizing a betatron as a Bremsstrahlung source. This method includes the steps of providing a source of energetic particles and directing those energetic particles at a formation having a known photoelectric factor and electron density and capturing one or more photons either emitted or deflected from the formation at either at a first detector or a second detector. The first detector is spaced a first distance from the source, the second detector is spaced a second distance from the source and a third distance separates the first detector from the second detector. Measuring a first total energy of the photons recorded by the first detector during a time interval and measuring a second total energy of the photons recorded by the second detector during the said time interval and disposing a first filter between the first detector and the formation effective to cause Pe response to match standoff influence thereby compensating for both effects simultaneously. In addition to the first filter, the required compensation may include a second filter between the second detector and the formation as well as adjustments to the respective first distance, second distance and third distance.

Figure 1:
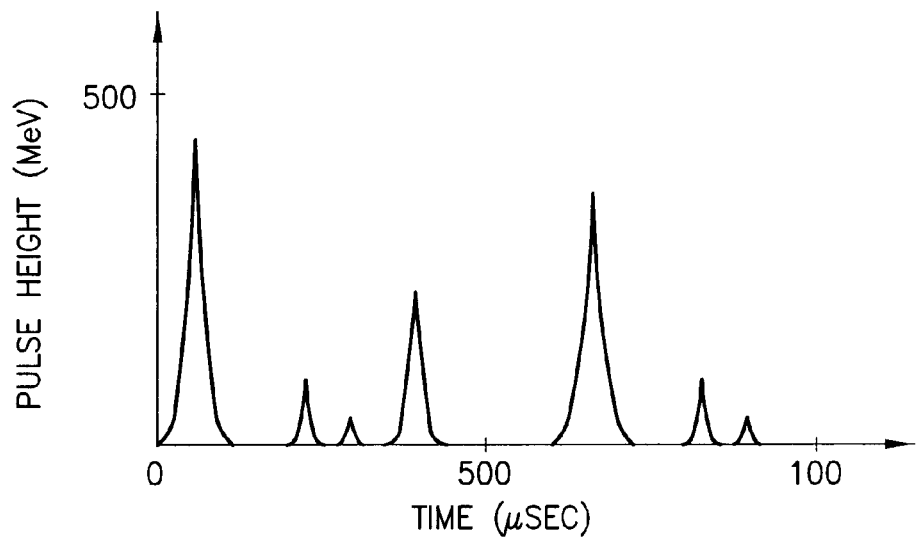
FIG. 1 graphically illustrates the pulse height of photons at a detector as a function of time when the source continuously emits photons as known from the prior art.
Figure 2:
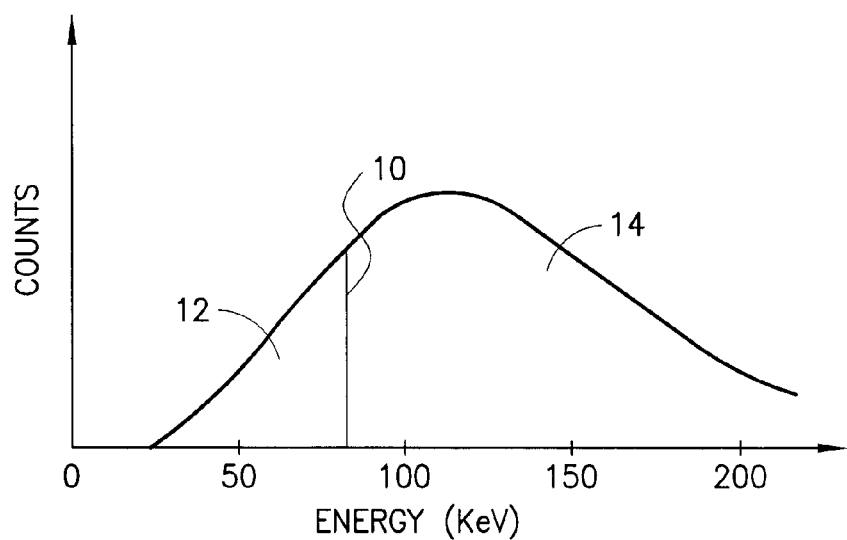
FIG. 2 relates the data in FIG. 1 to detected counts as a function of photon energy as known from the prior art.

FIG. 1 graphically represents the pulse height (in MeV) of photons detected by a sonde detector as a function of time when the photon source is a continuous emitter, such as a chemical radiation source, as known from the prior art. The pulses are of varying heights and impact the detector in a continuous and random fashion. As shown in FIG. 2, the pulse height is proportional to the energy of the photon and the number of counts at each energy level may be plotted. Reference line 10 represents approximately 80 KeV. Low energy region 12 contains data from photons primarily influenced by the photoelectric effect while high energy region 14 contains data from photons primarily influenced by Compton scattering. The data from the low energy region 12 and high energy region 14 are processed to extract density and composition information.

Figure 3:
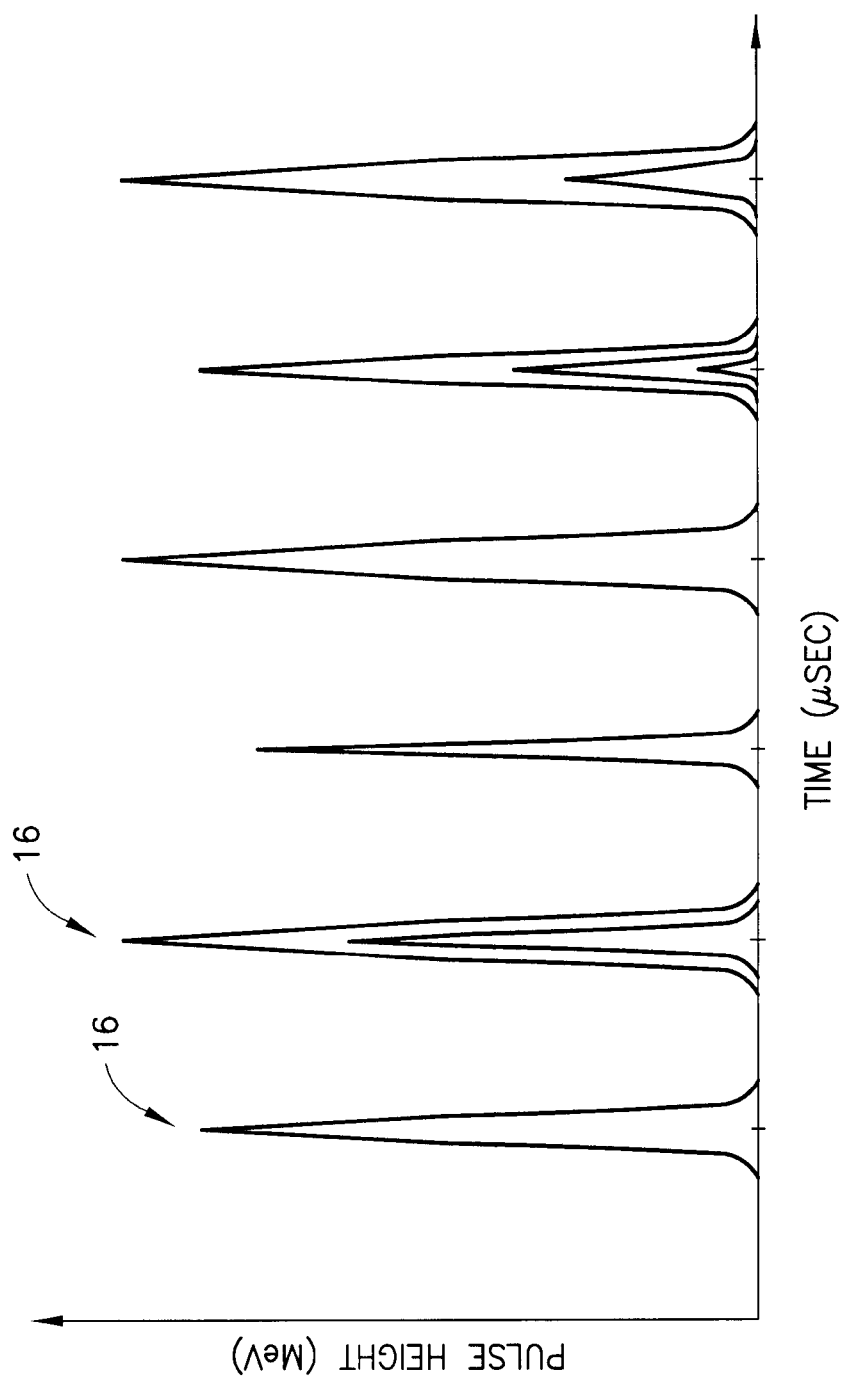
FIG. 3. graphically illustrates the detector signals as a function of time when the source emits short bursts of photons in regular interval. The strength of the signal is proportional to the total energy of all scoring photons within one burst according to an embodiment of the invention.

The data obtained from a pulsed photon source, such as betatron is illustrated in FIG. 3. The source photon has a continuous spectrum up to the electron beam end point energy, for example 1.5 MeV, as compared to a single line source, for example 662 KeV from a $Cs^{137}$ source. In addition, the duty cycle, which is the percentage of the time when photons are being emitted, is much shorter. A machine's duty cycle is proportional to the emission burst width and the burst repetition rate. While the chemical source is a continuous emitter, duty cycle=100%, the pulsed source has a low duty cycle, for example 0.2%, and the duration of photon emission in each cycle is very low, for example, 1 µsec and nominally from 0.5 µsec. to 3 µsec. Depending on the intensity of the photon emission, the detectors may or may not record a signal, and each scoring signal 16 may contain one or more photons. Thus, the energy levels of individual scoring photons are not readily determined. Only the total energy deposited per pulse is measured. An alternative method to remove Pe sensitivity must be employed.

Figure 4:
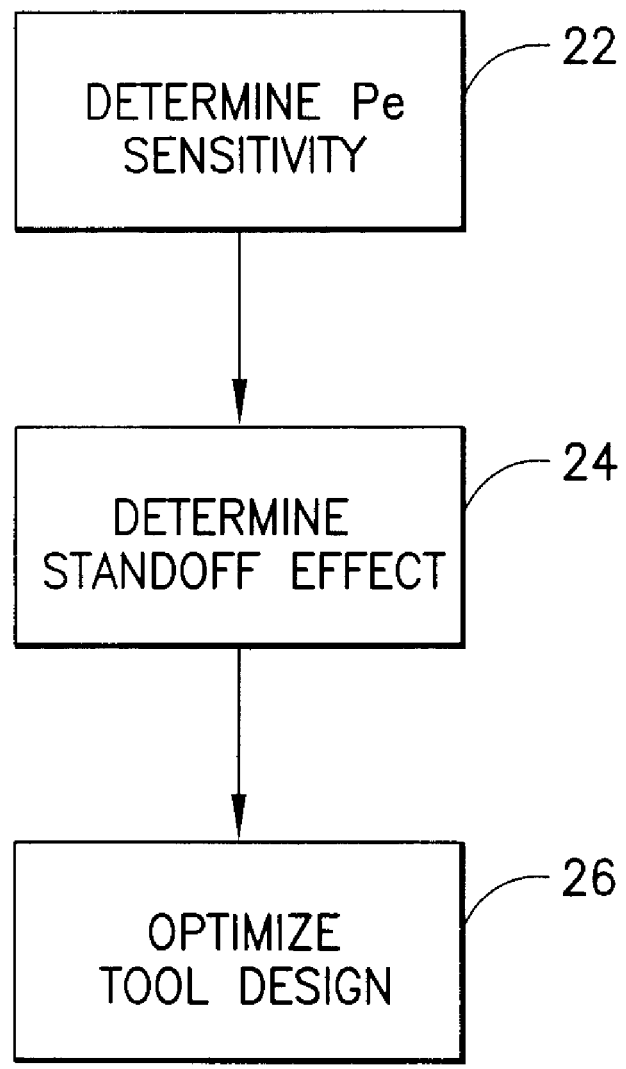
FIG. 4 illustrates in flow chart representation a sequence of steps to design a tool having Pe compensation as according to an embodiment of the invention.

Effective removal of Pe sensitivity is dependent on the measuring tool. Factors that affect Pe sensitivity include filter composition, filter thickness, spacing between a gamma ray source and the short space detector, spacing between the gamma ray source and the long space detector and spacing between the short space detector and the long space detector. Thus, by adjusting those parameters one can tailor a detector's Pe response. This invention proposes an algorithm to compensate the LS detector's Pe sensitivity on density measurement with carefully tailored SS detector response. The algorithm requires no prior knowledge of Pe nor does it sacrifice density precision by drastically filtering out low energy photons. FIG. 4 illustrates in block diagram a sequence of steps to design a measuring tool that is Pe compensated. As described below, the sequence of steps includes determining the Pe sensitivity of each detector 22, determining the effect of standoff on density measurements 24, and optimizing the tool design 26 by causing the Pe sensitivity and the standoff effect to be about equal.

In general, the standoff affects density measurements in a down hole environment to a greater degree than does Pe. The algorithm described herein tailors a detector response so that the Pe and standoff correction occur at the same time. An initial step is determining the Pe sensitivity 22, b/a, of the long space detector. The tool is operated in several controlled formation environments having different Pe values. The Pe sensitivity of the tool for zero standoff case is then extracted from the measured energy deposition in the LS detector utilizing the equation:

$$\log(N_{LS})=(a_{LS}+b_{LS}\times Pe)\times \rho_e+c_{LS} \quad \text{(Eq. 3)}$$

where:

$N_{LS}$ is the apparent LS detector energy deposition signal;

$a_{LS}$ is the density sensitivity, that is percentage change in detector signal per unit change in density;

$b_{LS}/a_{LS}$ is the Pe sensitivity, the percentage error in apparent density per unit change in Pe for a given $N_{LS}$;

Pe is the photoelectric factor for the formation environment;

$\rho_e$ is the electron density for the formation environment, and $c_{LS}$ is a normalization factor, that is source intensity dependent.

and recognizing that the corollary equation (3a) applies for the short space detector:

$$\text{(Eq.} \quad \log(N_{SS})=(a_{SS}+b_{SS}\times Pe)\times \rho_e+c_{SS} \quad \text{3a)}$$

The electron density and the Pe may be obtained from existing data, such as Table 1.

TABLE 1

| Formation Material | Density (g/cm³) | Electron Density (g/cm³) | Pe |
|---|---|---|---|
| Water | 1 | 1.1101 | 0.36 |
| Delrin | 1.41 | 1.5026 | 0.28 |
| Magnesium | 1.78 | 1.7529 | 2.5 |
| Sandstone (30% porous by volume) | 2.1578 | 2.1881 | 1.59 |
| Limestone (30% porous by volume) | 2.197 | 2.2283 | 4.38 |
| Sandstone | 2.654 | 2.65 | 1.81 |
| Limestone | 2.71 | 2.7075 | 5.08 |
| Dolomite | 2.87 | 2.8634 | 3.14 |
| Anhydrite | 2.96 | 2.9568 | 5.05 |
| Diabase | 3.0536 | 3.0263 | 4.4 |

Figure 5:
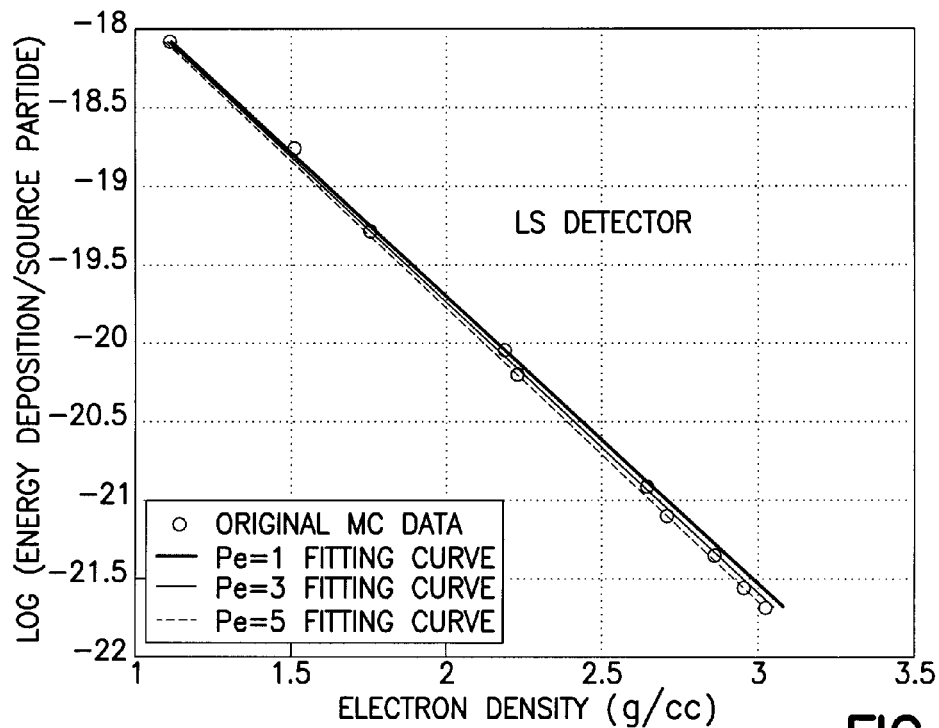
FIG. 5 graphically illustrates a method to determine density sensitivity and Pe sensitivity as according to an embodiment of the invention.

By then plotting Log(energy deposition per source particle) as a function of the electron density for a number of Pe values, $a_{LS}$, $b_{LS}$ and $c_{LS}$ are calculated by least square fitting of the existing data. As noted in FIG. 5, for a betatron measuring tool, the Pe sensitivity is very small, typically on the order of 1%, or less for Pe changes from 1 to 5.

One generally doesn't have prior knowledge of formation Pe. If one ignores the Pe term, the density fitting equation becomes:

$$\log(N_{LS}) = (a'_{LS})(\rho_e) + c'_{LS} \quad \text{(Eq. 4)}$$

We can derive the apparent long space detector density from Eqn. (4):

$$\rho_{LS\_app} = (\log(N_{LS}) - c'_{LS})/a'_{LS} \quad \text{(Eq. 5)}$$

and recognizing that the apparent short space detector density is the corollary equation:

$$\rho_{SS\_app} = (\log(N_{SS}) - c'_{SS})/a'_{SS} \quad \text{(Eq. 5a)}$$

The "apparent density" is that determined by the detector and is generally of number average of the densities through which the photon traveled and length of travel in each density. For example, in the presence of standoff, mud cake and formation rock may have different densities such that the apparent density is a combination of the two. Such that the correct, or compensated, formation density is related to the apparent density by:

$$\rho_{comp} = \rho_{LS\_app} + \Delta\rho \quad \text{(Eq. 6)}$$

Since SS and LS detectors have different sensitivities to standoff, by properly characterizing both detector's responses it is possible to extract $\Delta\rho$ from the difference in measured apparent densities, $\rho_{LS\_app} - \rho_{SS\_app}$, and Eqn. (6) becomes:

$$\rho_{comp} = \rho_{LS\_app} + \text{slope} \times (\rho_{LS\_app} - \rho_{SS\_app}) \quad \text{(Eq 7)}$$

Where the slope is the slope of a universal correction curve, or universal rib. One common technique used to correct the standoff effect is often referred to as the spine-and-rib analysis such as disclosed in U.S. Pat. No. 3,321,265.

Figure 6:
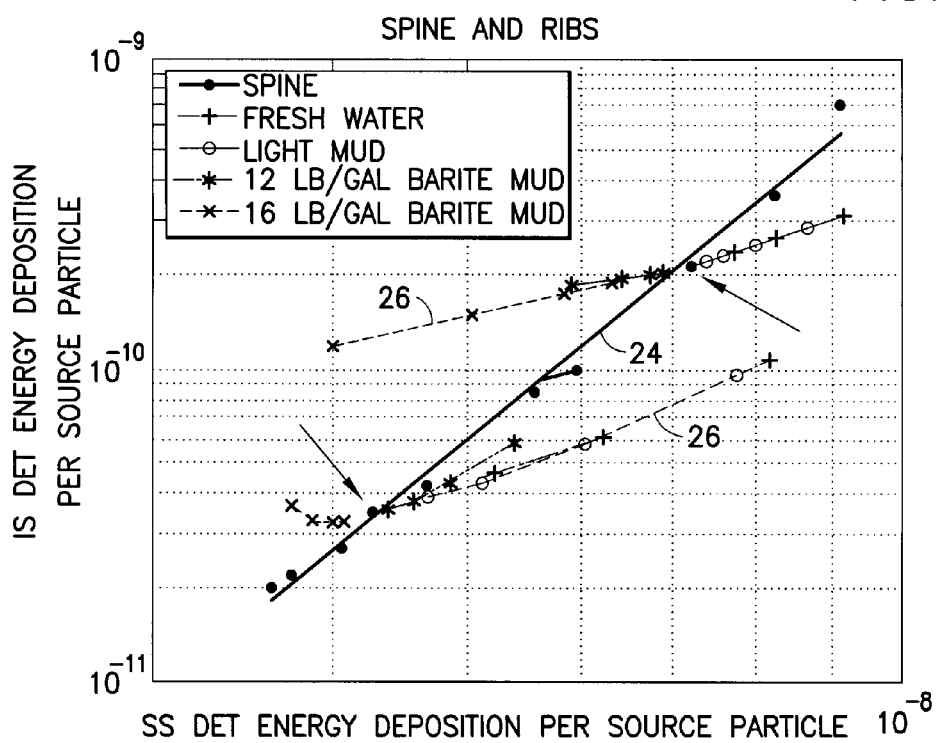
FIG. 6 graphically illustrates a spine and rib plot used to determine the effect of a standoff on the apparent density as according to an embodiment of the invention.

With reference to FIG. 6, the spine 24 is the locus of the detector signals of the long space (LS) detector and the short space (SS) detector in the absence of standoff. The ribs 26, trace out the detector signals, at a fixed formation density, in the presence of various standoff distances and with various types of mud. As is evident from FIG. 6, the amount of correction $\Delta\rho$ necessary to bring a point on the rib back to the spine is a function of $(\rho_{LS\_app} - \rho_{SS\_app})$, independent of the true formation density. Thus, one can characterize the standoff effect on the density measurement with a single universal rib. Spine-and-rib analysis disclosed in prior arts was intended only for standoff correction. The standoff compensated density, however, may still be subjected to error due to Pe effect. The present invention expands on the concept of spine-and-rib analysis for standoff effect by tailoring the LS and SS detector responses such that the Pe effect is also removed when one performs a spine- and rib correction for standoff effect.

Substituting equations (5) and (5a) into equation (7) leads to:

$$\rho_{comp} = ((1+\text{slope})/a'_{LS}) \times \log(N_{LS}) - ((\text{slope}/a'_{SS}) \times \log(N_{SS})) - ((1+\text{slope})/a'_{LS}) \times c'_{LS} + ((\text{slope}/a'_{SS}) \times c'_{SS} \quad \text{(Eq. 9)}$$

In a pulsed energy system, the total energy deposition, or counting rate, is a function of the formation Pe and the density. Substituting equations (3) and (3a) into equation (9) enables the compensated density to be expressed as:

$$\rho_{comp} = \rho_{e\_coe} \times \rho_e + Pe\_coe \times Pe \times \rho_e + C_{norm} \quad \text{(Eq. 10)}$$

where:

$$\rho_{e\_coe} = ((1 + \text{slope}) \times (a_{LS}/a'_{LS}) - (\text{slope} \times (a_{SS}/a'_{SS})) \quad \text{(Eq. 11)}$$

$$Pe_{coe} = ((1 + \text{slope}) \times (b_{LS}/a'_{LS}) - (\text{slope} \times (b_{SS}/a'_{SS})) \quad \text{(Eq. 12)}$$

$$C_{norm} = \frac{((1 + \text{slope}) \times ((c_{LS} - c'_{LS})/a'_{LS}) -}{(\text{slope} \times (c_{LS} - c'_{LS})/a'_{SS}))} \quad \text{(Eq. 13)}$$

Because the Pe effect is small, on the order of 1%, then $a_{LS}$ is about equal to $a'_{LS}$, $a_{SS}$ is about equal to $a'_{SS}$, $c_{LS}$ is about equal to $c'_{LS}$, and $c_{SS}$ is about equal to $c'_{SS}$. As a result, $\rho_{e\_coe}$ is about 1 and $C_{norm}$ is about 0.

To minimize the formation Pe effect, the Pe coefficient in equation (12) should approach 0:

$$((b_{LS}/a'_{LS})/(b_{SS}/a'_{SS})) = (\text{slope}/(1+\text{slope})) \quad \text{(14)}$$

The left hand term in equation (14) is the ratio of the LS and SS Pe sensitivity which may be adjusted by the detector filters. The right term of equation (14) is dependent on the slope of the ribs and may be adjusted by detector spacings. When equation (14) is satisfied, the compensated density is approximately equal to the true density:

$$\rho_{comp} \approx \rho_e \quad \text{(Eq. 15)}$$

Therefore, to optimize the tool design, the parameters to adjust are the detector spacings and the filters in front of each detector. The main criterion on the choice of filters is the balance of Pe responses between the SS and LS detectors rather than removal of low energy photons. Since the filter thickness is important, the filter materials are preferably those where a small variation in thickness will have a minimal impact on compensation. Preferred materials for the filters include iron and stainless steel. The LS filter should be as thin as possible to maximize the photon count rate and achieve better precision. Unlike the filters disclosed in U.S. Pat. No. 3,321,625 that were intended to eliminate all Pe sensitive low energy photons, the present filters match the LS and SS responses so that Pe is compensated for at the same time that the standoff is compensated (i.e. transitioning from $\rho_{app}$ to $\rho_{comp}$) without sacrificing precision.

Figure 7:
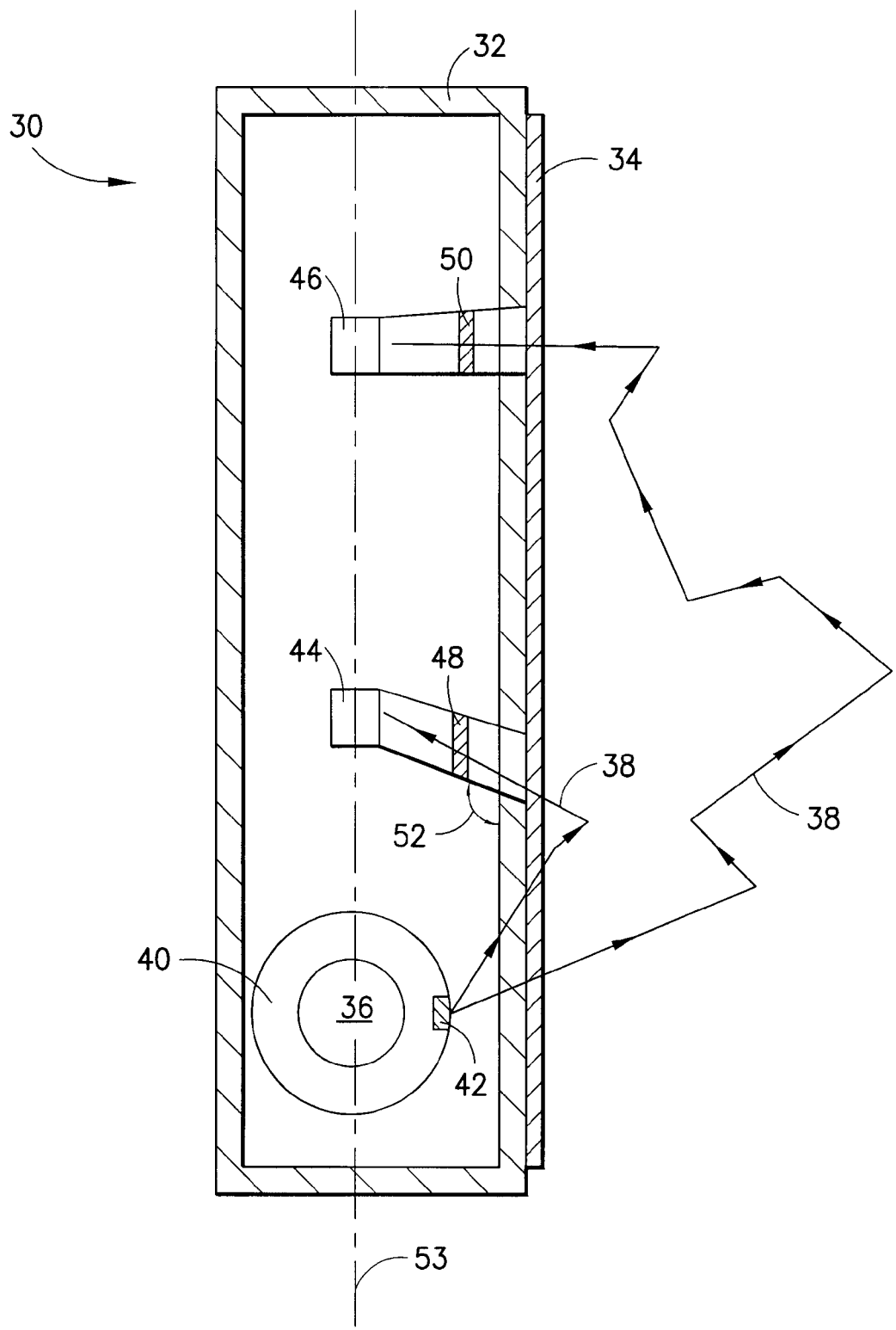
FIG. 7 illustrates a logging tool manufactured to have compensated Pe sensitivity as according to an embodiment of the invention.

FIG. 7 illustrates a pulsed energy density tool 30 that has Pe sensitivity compensation as described above. The tool housing 32 is faced on one side by a skid plate 34, such as stainless steel. The skid plate contacts the wall of the borehole (in a no standoff case) and protects the housing and tool from abrasion damage. A photon source 36, for example a 1.5 MeV betatron, emits pulses of photons 38. As is known in the art, the betatron 36 includes a passageway 40 where electrons are accelerated to relativistic velocity and directed into a target 42. As electrons slow down rapidly in the target, Bremsstrahlung photons are emitted. The photons interact with formation atoms (photoelectric effect and Compton scattering) and scoring photons are detected by either the SS detector 44 or the LS detector 46. A short space filter 48 formed from an effective material, such as iron or stainless steel of proper thickness, is positioned in front of the SS detector while a LS filter 50, also formed from an effective material such as iron or stainless steel, is positioned in front of the LS detector. The housing wall thickness may be formed to a required thickness and function as the filter. Nominally, the filters have thicknesses between about 0.25 cm and 0.75 cm. The SS detector 44 is collimated at an angle 52 of other than 90° relative to a longitudinal axis 53 of the tool to adjust effective detector spacing.

Figure 13:
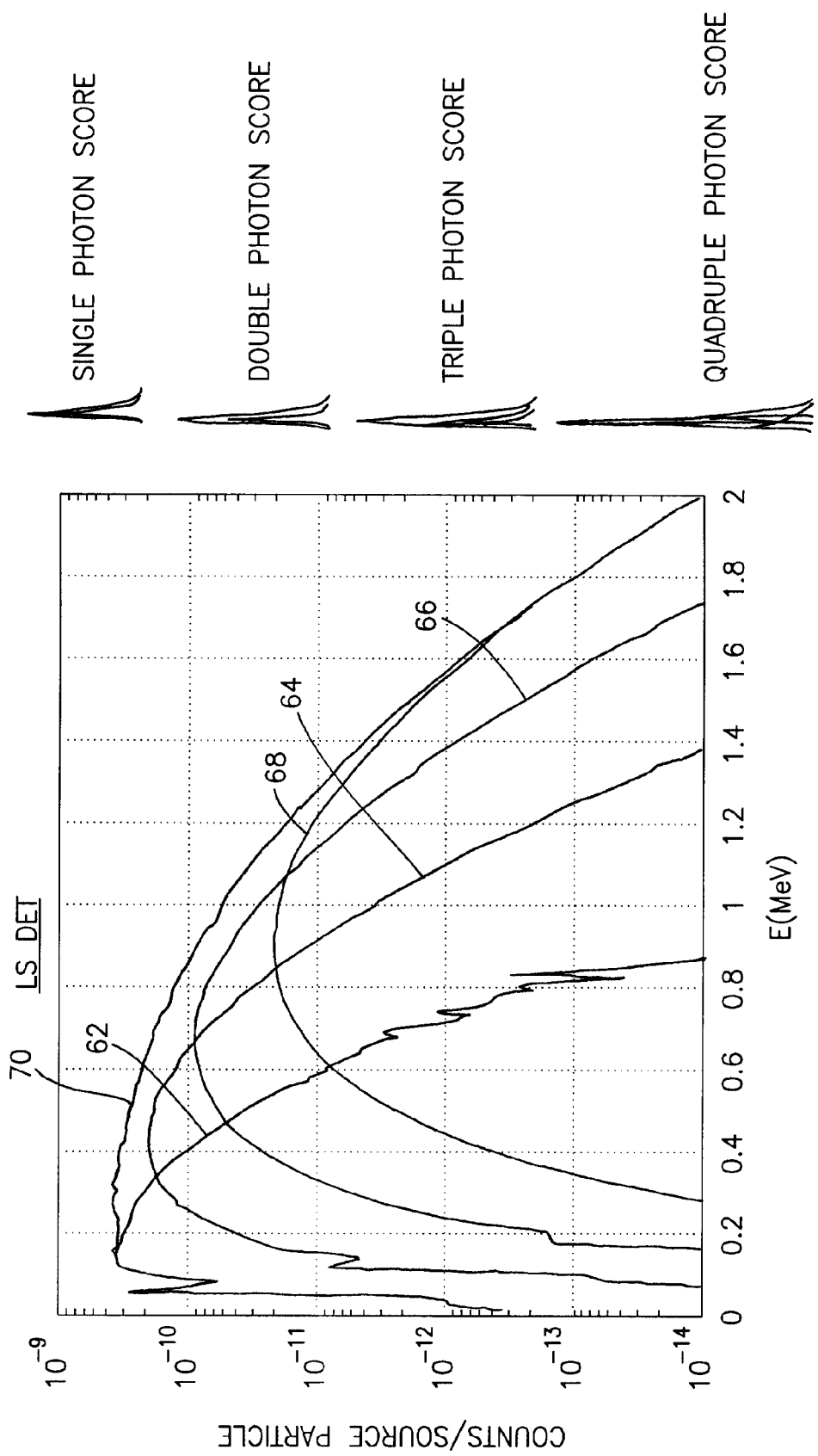
FIG. 13 graphically illustrates an LS detector response.

FIG. 13 is a typical LS detector response. Also shown are energy deposition spectra of single 62, double 64, triple 66 and quadruple 68 photon events as well as total score 70. The registered energy deposition spectrum (total score) is the sum of all events with appropriate weighting factors calculated from the apparent count rate (number of pulses with scoring events) and the pulse rate (for example, 2 kHz). Below about 150 keV, single photon events dominate. Thus the energy deposition spectrum below 150 keV is essentially the same as the true scoring photon energy distribution. This is also the region that is most sensitive to Pe effect, although the transition from Compton scattering dominance to Pe dominance is gradual and somewhat formation dependent. To extract Pe, we express the counting rate in that energy window as a function of formation density and Pe, shown in Equation 3. We used the compensated density (with accuracy smaller than ±0.02 g/cc) derived previously to extract Pe from the apparent LS detector spectrum.

Figure 14:
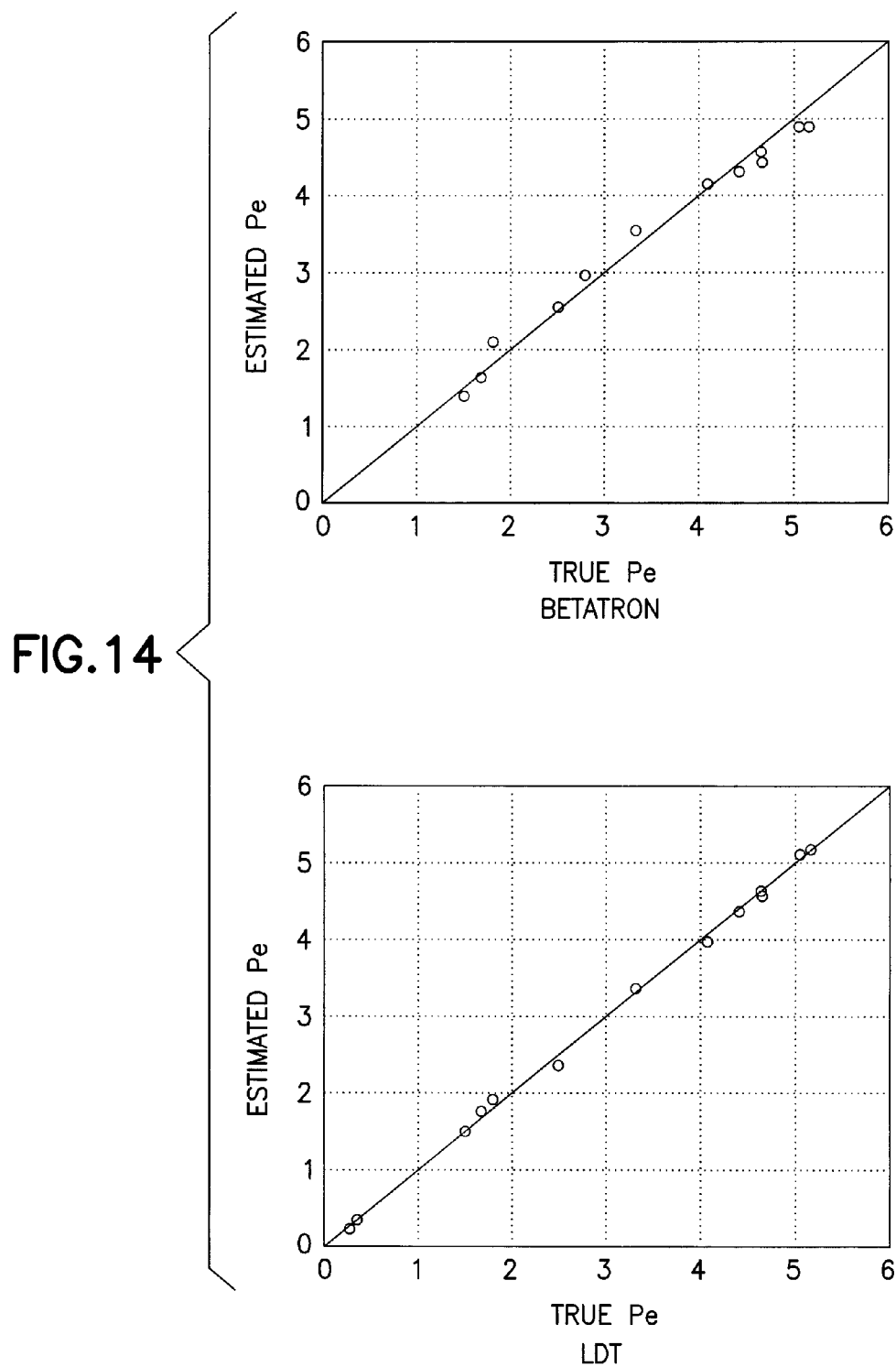
FIG. 14 illustrates comparisons of estimated Pe vs. true Pe for logging tools having pulsed and chemical sources.

FIG. 14 compares the estimated Pe vs. the true Pe for logging tools using a pulsed source and a chemical source such as LDT. The Pe accuracy (±0.3) using a pulsed source and the present algorithm is slightly less than that of a convention tool such as LDT (±0.15). Nevertheless, it's good enough for most applications. Since Pe measurement is very shallow, Pe measurement is applicable only to no-standoff case whether the source is a pulsed electronic source or a chemical source.

Figure 8:
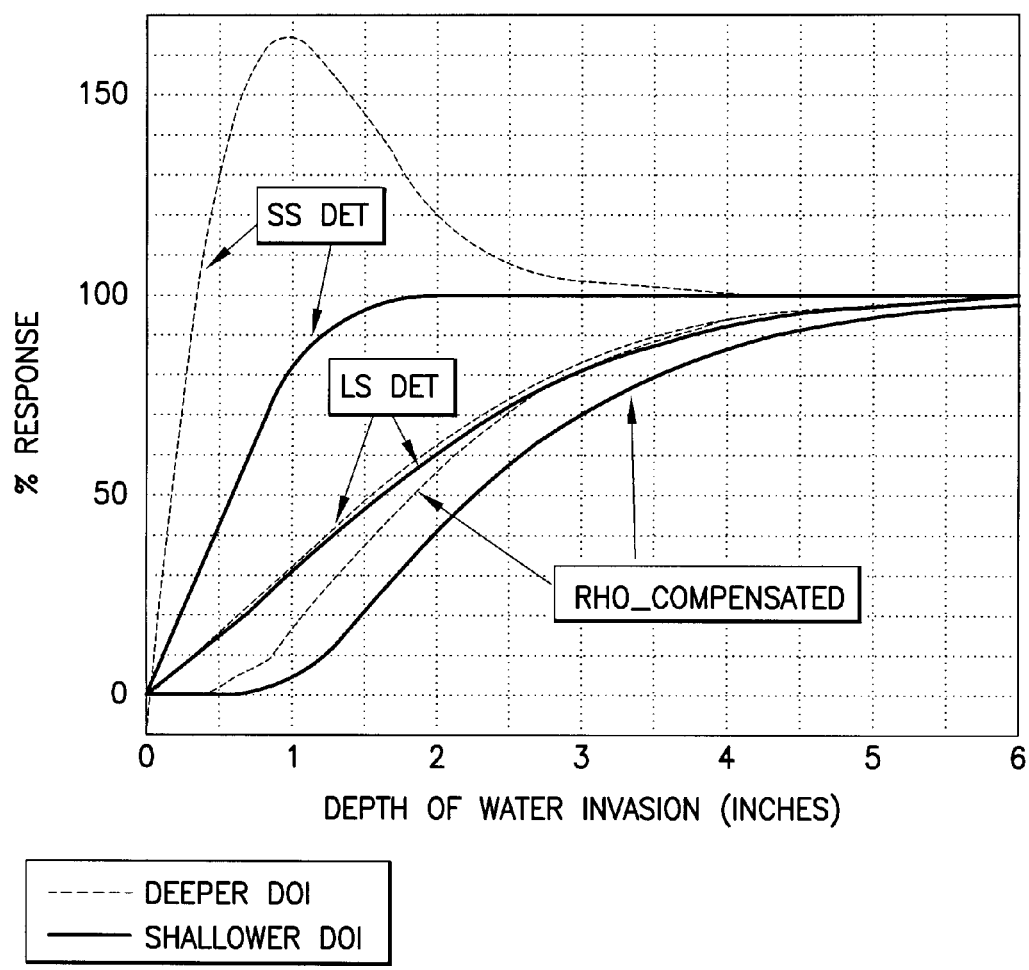
FIG. 8 graphically illustrates an analysis of a depth of water invasion into a gas zone to determine the depth sensitivity of density measurement (DOI, or depth of investigation) as according to an embodiment of the invention.

Another feature of the algorithm disclosed herein, independent of type of source used (DC or pulse), is to adjust the depth of investigation of the compensated measurement by adjusting the window and spacing of the short space detector. A deeper depth of investigation enable measurements deeper into the formation. One way to evaluate density measurement sensitivity to formation depths is to evaluate water invasion into a gas filled 20% porosity dolomite. FIG. 8 compares LS and SS water invasion responses for a pulsed and a conventional density tool employing a DC source. Both were evaluated at comparable LS spacing in. Although the LS responses are similar for both tools, the SS response of the design in the present invention is much deeper than the conventional tool. Consequently, the compensated response of the pulsed density tool, which takes into account the SS detector response using the algorithm described herein is also much deeper.

Figure 9:
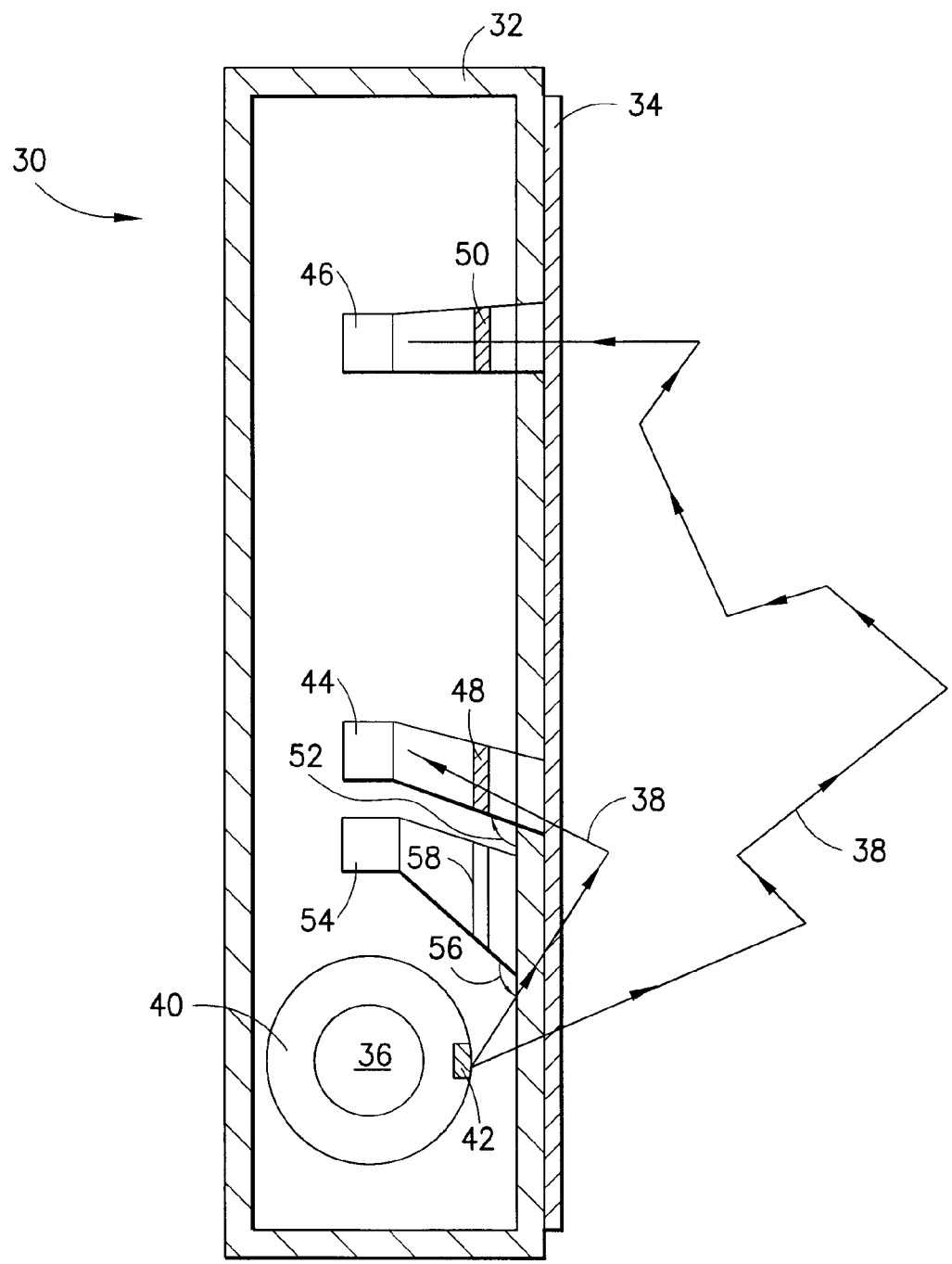
FIG. 9 illustrates an alternative logging tool with multiple depths of investigation as according to an embodiment of the invention.

As illustrated in FIG. 9, one way to obtain multiple depths of investigation is to include a second short space detector 54. This second short space detector 54 may have different collimation 56 and different filter 58 to see a depth different than that of the first SS detector 44. The second SS detector 54, when combined with the LS detector 46, will give a compensated measurement with a different depth of investigation. Also, as discussed above, it is possible to achieve multi-DOI (depth of investigation) of the compensated measurement by adding another SS detector. Further, the compensated measurement can allow for the analysis to choose the depth of the density measurement, by utilizing the additional detectors to provide for scanning the step profile depth of the density measurement into a formation, or also near borehole to exclude to minimize the effect of mudcake. Thus, resulting in a benefit of multiple detectors for various depth profiles in analysis. It is also possible to use a non-energy deposition measurement (spectroscopic) for the approach on multiple depth density measurements.

Referring back to FIG. 3, when a single photon is responsible for a registered signal, the photon energy is known and by combining information from many single scoring photons compositional data may be extracted. The fractions of the registered signals due to single, double, triple, etc photon events are results of statistical process. If the source intensity or source-detector spacing, is such that on average the number of scoring photons per photon emission burst at LS detector is about 1, then a fair fraction of the registered events consists of a single photon, and spectroscopy information may still be extracted. Two methods for extracting spectroscopy and/or Pe information are threshold discrimination and inversion. Inversion requires lengthy calculations and while suitable for post-processing may not be practical in real time data acquisition.

Figure 10:
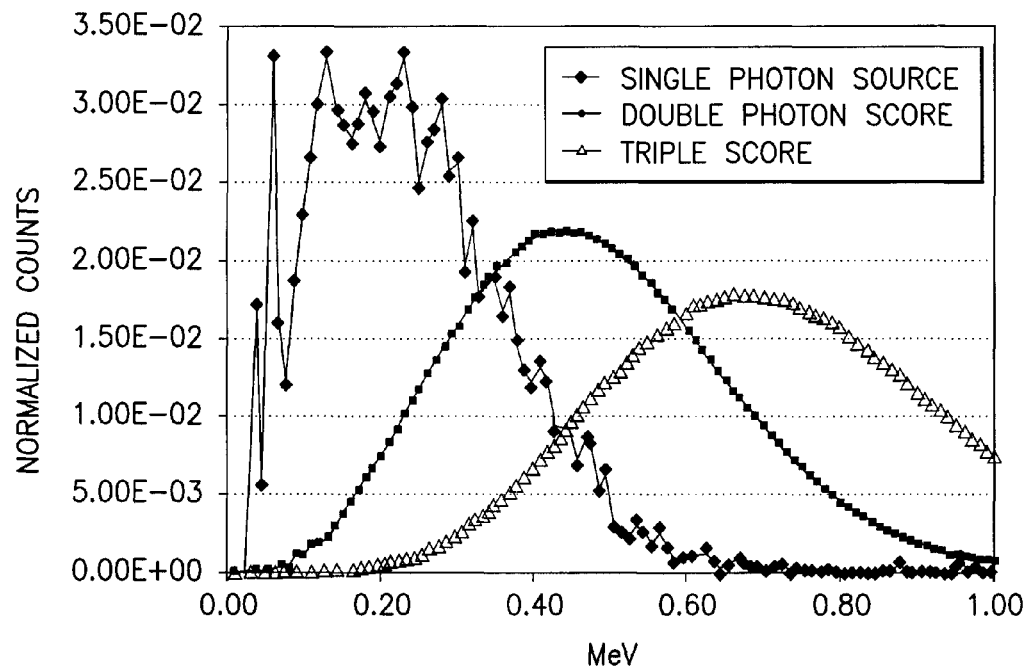
FIG. 10 graphically illustrates a number of single, double and triple photon scores as a function of photon energy in a porous limestone formation as according to an embodiment of the invention.
Figure 11:
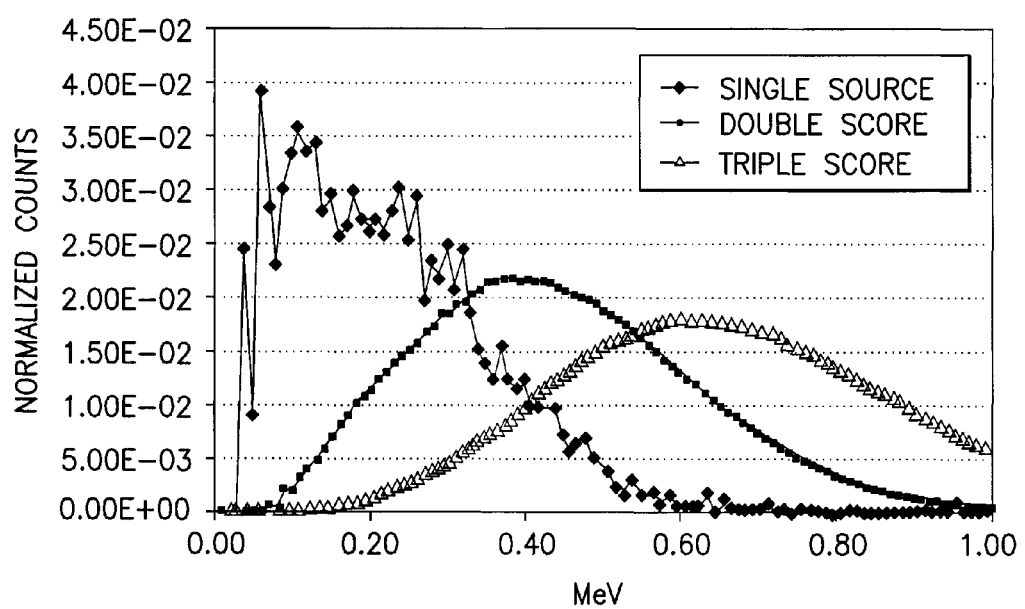
FIG. 11 graphically illustrates a number of single, double and triple photon scores as a function of photon energy in a porous sandstone formation as according to an embodiment of the invention.

The single photon score spectrum illustrated in the FIGS. 10 and 11 are spectra for 20 PuL (limestone with 20%, by volume, porosity) and 17 PuS (sandstone with 17%, by volume, porosity) with regular shielding, from which were generated the double and triple score spectra. The bin width was 10 keV. The spectra shown were normalized such that the total area=1.

The measured, or composite spectra, are count rate dependent. The count rates used were 3.425 kHz for 17 PuS and 3.031 kHz for 20 puL, assuming a 2 kHz betatron pulse rate. Since we know the pulse rate and how many of the pulses have scoring events, we can calculate the "true" count rates and the relative contributions from single photon score, double photon score . . . etc. to the "measured" or composite spectra. The results are summarized in Table 2 and FIGS. 10 and 11 (only single, double and triple score spectra are shown). Note that the mean spectral energy increases with the number of photons in the scoring events, and the jagged features in the single photon spectra are quickly lost.

TABLE 2

|  | 20 PuL | 17 PuS |
| --- | --- | --- |
| True count rates | 3.031 kHz | 3.425 kHz |
| Apparent count rates | 1.561 kHz | 1.639 kHz |
| Spectral contributions |  |  |
| single | 38.97% | 33.66% |
| double | 35.43% | 34.96% |
| triple | 19.04% | 22.04% |
| quadruple | 5.62% | 7.76% |

Assuming a Pe window of 0-100 keV (the first 10 bins). The normalized counts of single photon events within the Pe window are 0.126 and 0.188 for 20 puL and 17 puS, respectively. Those are the sums of the first 10 bins of the normalized single-score spectra, and they represent the "ground truths".

The corresponding "true" count rates within the Pe window from actual spectra are 0.382 kHz for 20 puL and 0.642 kHz for 17 puS, respectively, and the ratio is the Pe sensitivity which is 1.68.

Table 3 shows the contributions from single, double and triple score spectra to the "apparent" counts in the composite spectra within the Pe window. Those are what one should measure with the Pe threshold set at 100 keV.

TABLE 3

|  | 20 puL % of total | 17 puS % of total |
|---|---|---|
| Single | 4.906E−2 | 6.316E−2 |
| Double | 9.232E−4 | 1.804E−3 |
| Triple | 1.062E−6 | 3.366E−6 |
| Total | 4.999E−2 | 6.497E−2 |

For all practical purposes, the triple score (and higher) contribution may be ignored. In fact, contributions from the double score spectra are also very low. Thus, in the first pass, one may simply take all the counts below 100 keV from the composite spectra, and one gets 78 Hz (1.561 kHz×4.999e-2) for 20 puL and 106.5 Hz (1.639 kHz×6.497e-2) for 17 puS.

To correct for the count rates difference, there are two corrections to make: the relative contributions of single scoring events and the total count rates correction. Both can be done with the known parameters given in Table 2. The corrected count rates are:

78 Hz÷0.3897×(3.031÷1.561)=388.6 Hz for 20 puL, and
106.5 Hz÷0.3366×(3.425÷1.639)=661.2 Hz for 17 puS.

Those values are very close to the "ground truths" of 382 Hz and 642 Hz. The ratio between the reconstructed count rates is 1.70, whereas the "ground truth" for the ratio is 1.68. The slight difference (~1%) is due to the fact that single and double score contributions are combined. One can easily correct for the double score contributions by going through a second iteration.

Although one can reconstruct the correct count rates, this approach is not as accurate as true spectroscopy approach as in LDT, or even the approach of using a full fledged inversion technique. The price we pay is the lost counts. On the other hand, this example is by no means optimized. For example, by reducing the true total count rates, i.e. by detector placement, one will gain a little in Pe window count rate. One will gain more if one forgoes the converter, sets a threshold energy window and electronically determines counts below that threshold. Extending the energy window to 150 keV will also increase Pe window count rate at the expense of Pe sensitivity. For example, extending the energy window to 150 keV, the "ground truths" become 1.192 kHz for 17 puS and 0.831 kHz for 20 puL with a ratio of 1.435. The corresponding "measured" Pe window count rates are 209.6 Hz and 174.8 Hz, and 1.301 kHz and 0.871 kHz after count rates difference corrections. Although the re-constructed count rates are now higher than the "ground truths", the ratio (1.494) is still only 4% higher. One must bear in mind that the Pe window count rates must be balanced against the Pe sensitivity to obtain the most accurate results. Counts below about 25 keV or 30 keV may be contaminated with thermal noise, so a preferred energy window is 50 keV to 150 keV.

Although one can correct for the count rates difference, there are definite advantages to maintaining a constant count rate (i.e. with a feedback control of a carbon nanotube gate voltage) independent of the formation. One reason is that count rates difference "compresses" the apparent Pe sensitivity (i.e. the ratio drops) because the correction factor for a formation with a higher total count rate is larger than the one with a lower count rate. Even though the correction factors are quite accurate since they are derived based on the total number of scoring events, a compressed Pe sensitivity still leads to larger statistical errors. There is another practical reason why one wishes to maintain a constant count rate. One can calibrate the response to include multiple scoring events. However, doing so requires a constant count rate. Also, if the count rate is constant, then the corrections for single scoring events contribution and the total count rate are also constant. Thus the corrections may be factored into the tool response calibration.

An alternative to threshold discrimination is to extract the single photon energy distribution from the recorded energy deposition spectrum, either through a least square fitting procedure or spectrum inversion.

If $N_p$ is the number of x-ray pulses within a given duration, and $N_t$ is the total number of photon scores during those pulses, then the number of pulses $N_a(N_a < N_p)$ with at least one photon score is given by the following expression:

$$N_a = 1 + \frac{N_p - 1}{N_p} + \ldots + \left(\frac{N_p - 1}{N_p}\right)^{N_t - 1} = N_p\left[1 - \left(\frac{N_p - 1}{N_p}\right)^{N_t}\right]. \quad \text{(Eq. 16)}$$

It follows that:

$$N_t = \frac{\text{Ln}\left(1 - \frac{N_a}{N_p}\right)}{\text{Ln}\left(1 - \frac{1}{N_p}\right)} \approx -N_p \text{Ln}\left(1 - \frac{N_a}{N_p}\right) \text{ for } N_p \gg 1. \quad \text{(Eq. 17)}$$

The true average instantaneous photon scores per pulse is:

$$C_t = \frac{N_t}{N_p} \approx \text{Ln}\left(\frac{N_p}{N_p - N_a}\right). \quad \text{(Eq. 18)}$$

Figure 12:
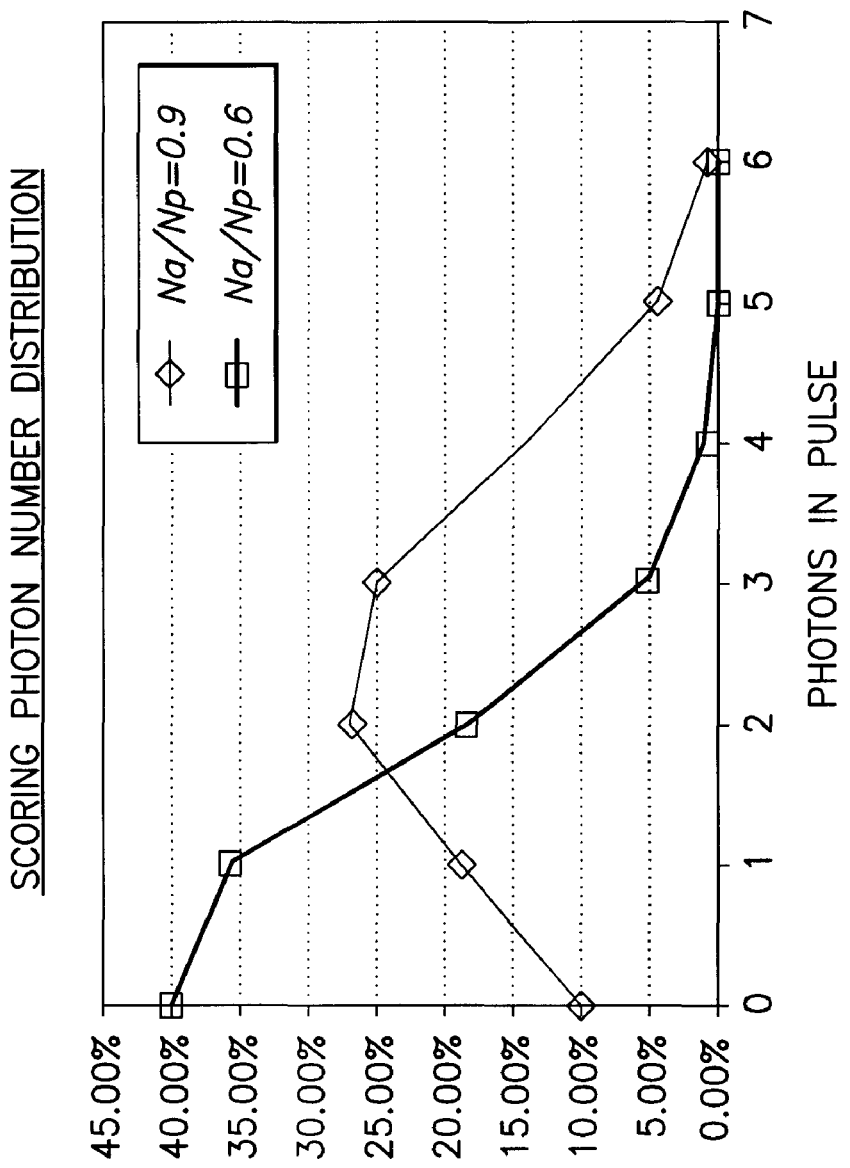
FIG. 12 graphically illustrates the number of photons per pulse as a percentage as according to an embodiment of the invention.

Since both $N_p$ and $N_a$ are known, one can calculate $N_t$ from equation (17). Note that it is $N_t$ that determines the statistical precision. One can apply equation (17) again to estimate the number of pulses with at least two photon scores by replacing $N_p$ with $N_a$ and $N_t$ with $N_t - N_a$ in equation (16). The same procedure may be repeated indefinitely to obtain the numbers of pulses with at least three, four, five scoring photons, etc. In this fashion, one obtains the scoring photon number distribution among $N_p$ pulses. FIG. 12 compares two photon number distributions with $N_a/N_p$=90% and 60%. As expected, the mean number of photon scores per pulse increases, whereas the percentage of pulses with single photon scores decreases, with $N_a/N_p$.

If $a_1$, $a_2$, $a_3$ ... and $p_1(E)$, $p_2(E)$, $p_3(E)$ ... are the fractions of pulses with, and the energy probability functions of, single, double, triple scores etc., then the measured energy probability distribution function is:

$$p(E) = \Sigma a_i p_i(E), E \geq 0 \quad \text{(Eq. 19)}$$

$p_i$ and $a_i$ are subjected to the following normalization conditions. The number distribution defined in eqn. (19) excludes pulses with zero score and is therefore different from those shown in FIG. 12:

$$\sum_i a_i = 1.$$

$\int p(E)dE = \int p_1(E)dE = \int p_2(E)dE = \ldots = \int p_i(E)dE = 1.$

By definition, $p_1(E)$, $p_2(E)$, $p_3(E)$ ... must also satisfy:

$p_i(E)=0$ for $E \leq 0$ and $p_i(E) \rightarrow$ Gaussian distribution for $i >> 1$.

The objective is to extract the spectroscopy information contained in $p_1(E)$ from the observed distribution $p(E)$. The equivalent number of scoring photons per pulse in the combined p distribution is:

$$\frac{N_t}{N_a} = \sum_i i \times a_i.$$

The total deposited energy for $N_p$ pulses is:

$E_{tot} = N_a \int E \times p(E)dE = N_a \overline{E} = N_t \overline{E}_1$ where $\overline{E}$ and $\overline{E}_1$ are mean energies of $p(E)$ and $p_1(E)$, respectively. Thus the mean energy of the $p_1(E)$ distribution, $\overline{E}_1$, can be derived directly from $p(E)$:

$$\overline{E}_1 = \frac{N_a}{N_t}\overline{E} = \frac{N_a}{N_t}\int E \times p(E)dE = \frac{\int E \times p(E)dE}{\sum_i i \times a_i} \quad \text{(Eq. 20)}$$

One can also derive the relationship between $\overline{E}$ and $\overline{E}_1$ by observing that photon scores are independent events and the mean energies of $p_2$, $p_3$ ... must be $2\overline{E}_1$, $3\overline{E}_1$ ... etc. In other words, the scaling factor $\Sigma i \times a_i$ between $\overline{E}$ and $\overline{E}_1$ is simply the result of photon statistics and therefore applies to all other single photon properties as well.

We will now describe the mathematical framework for inverting $p_1(E)$ from $p(E)$.

The double score energy distribution may be evaluated from the single score distribution according to the following formula:

$$p_2(E) = \int p_1(E-E')p_1(E')dE' = \int_{E' \leq E} p_1(E-E')p_1(E')dE' \quad \text{(Eq. 21)}$$

Similarly, the triple score energy distribution may be evaluated from $p_1(E)$ and $p_2(E)$:

$$p_3(E) = \int_{E' \leq E} p_1(E-E')p_2(E')dE' =$$

$$\int_{E' \leq E} dE' p_1(E-E') \int_{E'' \leq E'} dE'' p_1(E'-E'')p_1(E'') \text{ And}$$

$$p_4(E) = \int_{E' \leq E} p_1(E-E')p_3(E')dE' = \int_{E' \leq E} p_2(E-E')p_2(E')dE'$$

One can segment the continuous probability distribution functions into bins of constant probabilities. If $\Delta E$ is the energy bin width and $E_i$ is the mean energy of bin i, then the probability of a single photon score in bin i is:

$$P_1(E_i) = P_{1,i} = \overline{p}_1(E_i) \times \Delta E = \int_{E_i - 1/2\Delta E}^{E_i + 1/2\Delta E} p_1(E)dE$$

It is assumed that $\Delta E$ is sufficiently small that $p_1(E)$ may be considered to be constant within each bin.

The combined energy of two photons from bins i & j occupies two bin widths, from $E_j + E_i - \Delta E$ to $E_j + E_i + \Delta E$. Similarly, the combined energy of three photons occupies three bin widths, etc. Thus, the multi-photon energy distribution broadens as the number of scoring photons increases.

In discrete format the double photon scoring probability becomes:

$$P_2(E_j) = P_{2,j} = \int_{bin\ j} p_2(E)dE = \quad \text{(Eq. 22a)}$$

$$\int_{bin\ j} dE \int_{E' < E} p_1(E-E')p_1(E')dE' =$$

$$\sum_{i \leq j-1} P_{1,j-i} P_{1,i}$$

By the same token:

$$P_3(E_j) = P_{3,j} = \sum_{i \leq j-1} P_{1,j-i} P_{2,i}, \text{ etc.} \quad \text{(Eq. 22b)}$$

In matrix form:

$$\vec{P}_2 = [P_1] \cdot \vec{P}_1 \quad \text{(Eq. 22c)}$$

$$\vec{P}_3 = [P_1] \cdot \vec{P}_2 = [P_1]^2 \cdot \vec{P}_1 \quad \text{(Eq. 22d)}$$

...

$$\vec{P}_k = [P_1] \cdot \vec{P}_{k-1} = [P_1]^{k-1} \cdot \vec{P}_1 \quad \text{(Eq. 23)}$$

where $\vec{P}_1$ is the column matrix:

$$\vec{P}_1 = \begin{pmatrix} P_{1,1} \\ P_{1,2} \\ P_{1,3} \\ \vdots \end{pmatrix} \quad \text{(Eq. 23a)}$$

and $[P_1]$ is a lower triangular Toeplitz matrix:

$$[P_1] = \begin{bmatrix} 0 & 0 & 0 & \dots \\ P_{1,1} & 0 & 0 & \dots \\ P_{1,2} & P_{1,1} & 0 & 0 & \dots \\ P_{1,3} & P_{1,2} & P_{1,1} & 0 & \dots \\ \dots & & & & \end{bmatrix} \quad \text{(Eq. 24)}$$

The numbers of rows and columns of $[P_1]$ may be as large as necessary to evaluate eqn. (23a). The matrix representation of eqn. (20) becomes:

$$\vec{P} = (a_1 + a_2[P_1] + a_3[P_1]^2 + \dots) \cdot \vec{P}_1 = [P] \cdot \vec{P}_1 \quad \text{(Eq. 25)}$$

Eqns. (22)-(25) depict a recipe for constructing multi-photon distributions from the single photon distribution, and eqn. (25) provides a set of (non-linear) equations from which elements of $\vec{P}_1$ may be solved via a non-linear least square fit procedure, i.e. Levenberg-Marquardt method. This may be done by assuming an appropriate single photon distribution function. One such function is of the following form:

$$P_1(E) = b_0 \times e^{-b_1(E-b_5)} \times [1 - e^{-b_2(E-b_5) - b_3(E-b_5)^2 - b_4(E-b_5)^3}], \quad \text{(Eq. 26)}$$

where $b_0$ is a normalization constant (to satisfies the condition $\Sigma P_{1,i} = 1$), and $b_{1-5}$ are fitting parameters.

Another technique of extracting $p_1(E)$ is via spectrum inversion. If one multiplies a lower Toeplitz matrix with another lower Toeplitz matrix the resulting product is also a triangular Toeplitz matrix:

$$\begin{bmatrix} \alpha_1 & 0 & 0 & \dots \\ \alpha_2 & \alpha_1 & 0 & 0 & \dots \\ \alpha_3 & \alpha_2 & \alpha_1 & 0 & \dots \\ & & \dots & & \end{bmatrix} \cdot \begin{bmatrix} \beta_1 & 0 & 0 & \dots \\ \beta_2 & \beta_1 & 0 & 0 & \dots \\ \beta_3 & \beta_2 & \beta_1 & 0 & \dots \\ & & \dots & & \end{bmatrix} = \quad \text{(Eq. 27)}$$

$$\begin{bmatrix} \gamma_1 & 0 & 0 & \dots \\ \gamma_2 & \gamma_1 & 0 & 0 & \dots \\ \gamma_3 & \gamma_2 & \gamma_1 & 0 & \dots \\ & & \dots & & \end{bmatrix}$$

$$\gamma_1 = \alpha_1 \beta_1$$
$$\gamma_2 = \alpha_1 \beta_2 + \alpha_2 \beta_1$$
$$\gamma_3 = \alpha_1 \beta_3 + \alpha_2 \beta_2 + \alpha_3 \beta_1$$
$$\dots$$
$$\gamma_j = \sum_{i=1}^{j} \alpha_{j+1-i} \beta_i$$

In our implementation the matrix elements are bin-scoring probabilities. In practice they are non-zero only over a finite range. If we define the lower rank of a Toeplitz matrix $[\alpha]$ to be the row number of the last zero in the first column before the non-zero distribution begins then eqn. (27) states that the lower rank of $[\gamma]$ is equal to the sum of the lower ranks of $[\alpha]$ and $[\beta]$. Since $[P_1]$ given in eqn. (24) has a lower rank of at least 1, the multi-photon distribution $P_k$ shifts toward high energy with the number of photons k. Similarly we can define the upper rank of $[\alpha]$ to be the row number of the last non-zero element in the first column. It follows that the upper rank of $[\gamma]$ is the sum of the upper ranks of $[\gamma]$ and $[\beta]$ minus one.

Because there is always some absorbing material between the detector and the formation even without a Pe filter, the minimum scoring photon energy is usually around tens of keV. It is also desirable to set the minimum scoring photon energy above the thermal noise, which for NaI is about 25-30 keV at borehole temperature. In other words, the lower rank of $[P_1]$ is usually much greater than 1. If $\alpha_i = 0$ for $i \leq n$ and $i > n'$, and $\beta_i = 0$ for $i \leq m$ and $i > m'$, then according to eqn. (27), $\gamma_j = 0$ for $j \leq n+m$ and $j \geq n'+m'$. Setting $\alpha_1 = 0$, $\alpha_2 = \beta_1 = P_{1,1} \dots$ etc. one can easily show that the non-zero elements occupy bins 2n to 2n'-2 in $\vec{P}_2$, and 3n to 3n'-3 in $\vec{P}_3$, etc. For $\vec{P}_k$, the number of non-zero elements is $k[n'-(n+1)]+1$, starting from element $k \times n$. Thus, all scores below bin 2n are single photon scores. Between 2n and 3n are single and double photon scores, etc. The lowest energy non-zero elements in a multi-photon distribution shift up by n bins and the distribution broadens by $n'-(n+1)$ bins every time one more photon is added. Furthermore, because $\gamma_j$ is obtained by summing the products of a high-energy bin probability with a low-energy bin probability, the multi-photon distribution becomes more symmetric as more photons are added. It eventually approaches a Gaussian distribution.

Since those terms in eqn. (27) with $m > i > j - n$ don't contribute to the sum, eqn. (27) reduces to:

$$\gamma_j = \sum_{i=m+1}^{j-n} \alpha_{j+1-i} \beta_i \quad \text{(Eq. 28)}$$

The above expression implies that any element $\gamma_i$ in $\vec{P}_k$ depends only on elements $\beta_{i \leq j-n}$ in $P_{k-1}$ and elements $\alpha_{i \leq j-m}$ in $\vec{P}_1$, where $m = (k-1) \times n$. Combining eqn. (28) with eqns. (22) and (23) leads to:

$$\left. \begin{array}{l} P_{1,j} = P_j \\ P_{k>1,j} = 0 \end{array} \right\} \text{block } 1, j = n+1 \to \quad \text{(Eq. 29)}$$

$$\left. \begin{array}{l} P_{2,j} = \sum_{i=n+1}^{j-n} P_{1,i} P_{1,j+1-i} \\ P_{1,j} = (P_j - a_2 P_{2,j})/a_1 \\ P_{k>2,j} = 0 \end{array} \right\} \text{block } 2, j = 2n+1 \to 3n$$

$$\left. \begin{array}{l} p_{l,j} = \sum_{i=(l-1)n+1}^{j-n} P_{l-1,i} P_{1,j+1-i} \\ \dots \\ P_{2,j} = \sum_{i=n+1}^{j-n} P_{1,i} P_{1,j+1-i} \\ P_{1,j} = (P_j - a_2 P_{2,j} - a_3 P_{3,j} - \dots)/a_1 \\ P_{k>l,j} = 0 \end{array} \right\}$$

block $l, j = \ln + 1 \to (l+1) \times n$

Eqn. (29) states that Counts in any given block of $P_1$, $P_2, \dots$ depend only on counts in previous blocks, and because block 1 bins consist of only $P_1$, one can reconstruct the entire $P_1, P_2, \dots$ spectra from the measured block 1 bins in P through a simple iteration procedure. Although it may be difficult to pin point the location of bin n from P, in reality where bin n lies has no consequence on the results. The lower summation limits in eqn. (29) merely indicate that there is no contribution to the probability distributions in question from bins below those limits. It is therefore fairly safe to assign the first non-zero bin in P to $P_1$ and start the iteration from there.

EXAMPLES

Example 1

Example 1 illustrates how equation (17) is utilized to prepare a compensated tool. A tool as illustrated in FIG. 7 was evaluated with a number of SS/LS spacing, collimation angles and filter thicknesses. Five values were calculated, $\rho_{e\_coe}$; $Pe_{-coe}$; Slope; No Standoff Accuracy; and 0.5 inch Standoff Accuracy and are listed sequentially in each box of Table 4. As shown in Table 4, the optimal configuration is with a 0.39 cm stainless steel LS filter and a 0.5 cm iron SS filter with the SS collimator at an angle of 70° relative to a longitudinal axis of the tool.

TABLE 4

| Long Space → Short Space ↓ | Increasing Cs20 | Filter Cs33 | Thickness Cs22 | → Cs32 | → Cs25 |
|---|---|---|---|---|---|
| 90° Collimator | 0.96 ± 0.08 | 1.00 ± 0.05 | 1.00 ± 0.05 | 1.02 ± 0.04 | 1.03 ± 0.04 |
| Increasing Filter | 0.009 ± 0.003 | 0.002 ± 0.003 | 0.001 ± 0.002 | −0.002 ± 0.002 | −0.003 ± 0.002 |
| Thickness ↓ | 0.78 ± 0.06 | 0.64 ± 0.06 | 0.63 ± 0.06 | 0.55 ± 0.07 | 0.54 ± 0.07 |
|  | −0.04~0.04 | −0.03~0.02 | −0.03~0.02 | −0.03~0.01 | −0.04~0.01 |
| cs31 | −0.04~0.06 | −0.07~0.05 | −0.09~0.09 | −0.09~0.06 | −0.06~0.06 |
| 90° Collimator | 0.93 ± 0.07 | 0.97 ± 0.05 | 0.98 ± 0.05 | 1.00 ± 0.03 | 1.00 ± 0.03 |
| Increasing Filter | 0.013 ± 0.003 | 0.005 ± 0.002 | 0.004 ± 0.002 | 0.001 ± 0.001 | 0.000 ± 0.002 |
| Thickness ↓ | 0.77 ± 0.11 | 0.69 ± 0.05 | 0.66 ± 0.06 | 0.55 ± 0.07 | 0.49 ± 0.08 |
|  | −0.06~0.06 | −0.04~0.03 | −0.04~0.02 | −0.02~0.01 | −0.02~0.01 |
| cs32 | −0.11~0.06 | −0.05~0.05 | −0.06~0.02 | −0.04~0.07 | −0.06~0.04 |
| 90° Collimator | 0.91 ± 0.07 | 0.96 ± 0.05 | 0.96 ± 0.05 | 0.99 ± 0.03 | 1.00 ± 0.03 |
| Increasing Filter | 0.015 ± 0.003 | 0.007 ± 0.003 | 0.006 ± 0.002 | 0.003 ± 0.001 | 0.001 ± 0.002 |
| Thickness ↓ | 0.64 ± 0.14 | 0.71 ± 0.06 | 0.69 ± 0.06 | 0.62 ± 0.05 | 0.53 ± 0.07 |
|  | −0.07~0.06 | −0.04~0.04 | −0.05~0.03 | −0.02~0.01 | −0.01~0.01 |
| cs28 | −0.12~0.06 | −0.07~0.04 | −0.06~0.03 | −0.02~0.03 | −0.03~0.07 |
| 90° Collimator | 0.90 ± 0.06 | 0.94 ± 0.05 | 0.95 ± 0.04 | 0.97 ± 0.03 | 0.98 ± 0.03 |
| Increasing Filter | 0.016 ± 0.003 | 0.009 ± 0.003 | 0.008 ± 0.002 | 0.004 ± 0.001 | 0.003 ± 0.002 |
| Thickness ↓ | 0.45 ± 0.16 | 0.63 ± 0.08 | 0.63 ± 0.08 | 0.63 ± 0.05 | 0.57 ± 0.06 |
|  | −0.07~0.06 | −0.06~0.04 | −0.05~0.03 | −0.02~0.02 | −0.02~0.01 |
| cs30 | −0.15~0.06 | −0.10~0.04 | −0.09~0.03 | −0.03~0.03 | −0.04~0.03 |
| 90° Collimator | 0.89 ± 0.06 | 0.94 ± 0.04 | 0.95 ± 0.04 | 0.97 ± 0.03 | 0.98 ± 0.03 |
| Increasing Filter | 0.017 ± 0.003 | 0.010 ± 0.002 | 0.009 ± 0.002 | 0.005 ± 0.001 | 0.004 ± 0.002 |
| Thickness ↓ | 0.55 ± 0.20 | 0.44 ± 0.11 | 0.42 ± 0.10 | 0.48 ± 0.07 | 0.48 ± 0.05 |
|  | −0.07~0.06 | −0.05~0.04 | −0.05~0.03 | −0.03~0.02 | −0.03~0.02 |
| cs29 | −0.20~0.08 | −0.09~0.08 | −0.14~0.07 | −0.09~0.04 | −0.07~0.03 |
| 70° Collimator | 0.96 ± 0.07 | 0.99 ± 0.05 | 1.00 ± 0.05 | 1.01 ± 0.03 | 1.02 ± 0.03 |
| Increasing Filter | 0.009 ± 0.003 | 0.002 ± 0.002 | 0.001 ± 0.002 | −0.001 ± 0.001 | −0.002 ± 0.002 |
| Thickness ↓ | 0.64 ± 0.05 | 0.53 ± 0.04 | 0.52 ± 0.05 | 0.44 ± 0.05 | 0.41 ± 0.06 |
|  | −0.05~0.04 | −0.03~0.02 | −0.03~0.03 | −0.02~0.02 | −0.03~0.02 |
| cs34 | −0.07~0.03 | −0.05~0.04 | −0.06~0.06 | −0.07~0.09 | −0.04~0.04 |
| 70° Collimator |  |  |  | 1.00 ± 0.03 |  |
| Increasing Filter |  |  |  | 0.001 ± 0.001 |  |
| Thickness ↓ |  |  |  | 0.50 ± 0.05 |  |
|  |  |  |  | −0.01~0.01 |  |
| cs36 |  |  |  | −0.02~0.02 |  |
| 70° Collimator | 0.92 ± 0.06 | 0.97 ± 0.05 | 0.97 ± 0.04 | 0.99 ± 0.03 | 1.00 ± 0.03 |
| Increasing Filter | 0.014 ± 0.003 | 0.006 ± 0.002 | 0.005 ± 0.002 | 0.002 ± 0.001 | 0.001 ± 0.002 |
| Thickness ↓ | 0.51 ± 0.11 | 0.55 ± 0.05 | 0.54 ± 0.05 | 0.49 ± 0.04 | 0.43 ± 0.06 |
|  | −0.07~0.06 | −0.04~0.04 | −0.04~0.03 | −0.01~0.01 | −0.02~0.01 |
| cs35 | −0.15~0.06 | 0.07~0.04 | −0.07~0.03 | −0.04~0.02 | −0.04~0.05 |

From Table 4, the combination cs36/cs32 provides the most effective tool. $\rho_{e\_coe}$ is very close to 1;
$Pe_{-coe}$ is very close to 0;
Slope is about 0.5;
No Standoff Accuracy is quite good; and
0.5 inch Standoff Accuracy is also quite good.

Example 2

Figure 15:
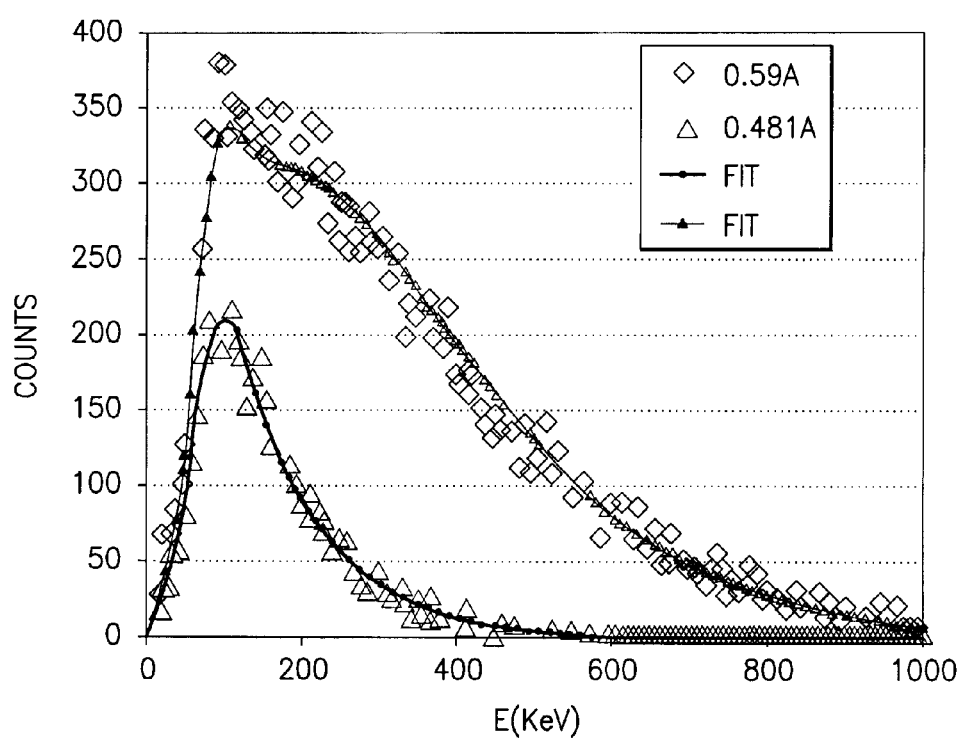
FIG. 15 graphically compares spectra data for two betatron pulse durations as according to an embodiment of the invention.

Example 2 illustrates the inversion technique for obtaining compositional data. FIG. 15 compares two NaI detector spectra using a betatron source. The source to detector spacing was 14 inches in slab geometry. The formation was epoxy gravel. No Pe filter was used, and the electron beam end point energy was ~1.7 MeV. The only difference between the two spectra was their cathode heater current, which affects only the intensity of the source, hence the ratio $N_a/N_p$.

A distinct feature of the higher count rate spectrum is the hump due to the $P_2$ distribution. Table 5 lists known and derived spectral information based on preceding discussions.

TABLE 5

| Heater current | 0.481A | 0.59 A |
|---|---|---|
| $N_p$ | 36000 | 24000 |
| $N_a$ | 4836 | 19670 |
| $N_p/N_a$ | 0.134 | 0.819 |
| $N_t$ | 5193 | 41098 |

TABLE 5-continued

| $N_t/N_a$ | 1.074 | 2.089 |
|---|---|---|
| $\bar{E}$(keV) | 162.8 | 319.3 |
| $\bar{E}_1$ (keV) | 151.6 | 152.8 |
| $a_1$ | 92.93% | 33.66% |
| $a_2$ | 6.84% | 34.96% |
| $a_3$ | 0.23% | 22.04% |
| $a_4$ | 0 | 7.76% |
| $a_5$ | 0 | 1.44% |
| $a_6$ | 0 | 0.13% |

Figure 16:
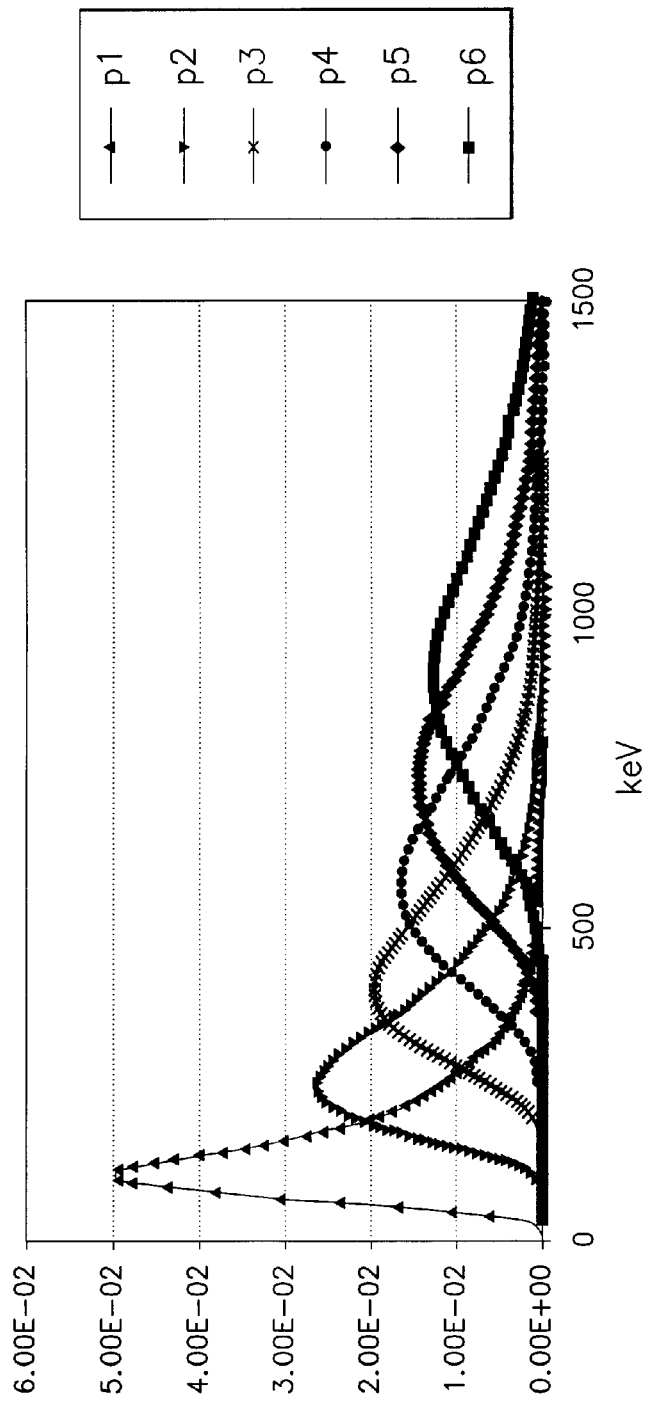
FIG. 16 graphically illustrates a multi-photon spectra obtained from an algorithm described herein.

The two curves in FIG. 15 were obtained by assuming the following single photon probability function:

$$P_1(E) = b_0 \times e^{-b_1(E-b_5)} \times [1 - e^{-b_2(E-b_5) - b_3(E-b_5)^2 - b_4(E-b_5)^3}], \quad \text{(Eq. 30)}$$

where $b_0$ is a normalization constant (to satisfies the condition $\Sigma P_{1,i}=1$), and $b_{1-5}$ are fitting parameters. I then constructed $P_1$, $P_2$, ... for $N_d/N_p=13\%$ and 81% from eqns. (6-7). The results for $N_d/N_p=81\%$ are given in FIG. 16. From those one may construct the expected energy deposition spectra P according to equation. (25). The "fitted" spectra shown in FIG. 15 were first modified from P by assuming that 20% of the scores resulted in iodine escapes (by shifting 20% of counts in channel E to channel E-29 keV). The resulting spectra were then degraded to include the effect of the detector resolution, approximately equal to $$1.105\sqrt{E(keV)}.$$

Neither effect caused any appreciable change in the spectral shapes. The two curves given in FIG. 15 were the results of a simple eyeball fit rather than a rigorous non-linear least square fit. Still, both curves fit the measurements rather well. Although the two spectra have very different $N_d/N_p$ ratios, and the spectral shapes are very different, the agreement between $\overline{E}_1$ is well within the statistical precisions (note that one spectrum has only ~5200 true photon scores), suggesting that the partition formula, equation (20), is quite accurate.

One or more embodiments of the present invention described. Nevertheless, it will be understood that various modifications may be made without departing from the spirit and scope of the invention. It is noted that the foregoing examples have been provided merely for the purpose of explanation and are in no way to be construed as limiting of the present invention. While the present invention has been described with reference to an exemplary embodiment, it is understood that the words, which have been used herein, are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. A method to compensate for the photoelectric effect in pulsed γ-γ density tools, comprising the steps of:
   providing a source of energetic particles and directing those energetic particles at a formation having a known photoelectric factor and electron density;
   capturing one or more photons either emitted or deflected from said formation with one of a first detector and a second detector, wherein said first detector is spaced a first distance from said source, said second detector is spaced a second distance from said source and a third distance separates said first detector from said second detector;
   measuring a first total energy of said one or more photons striking said first detector during a time interval and measuring a second total energy of said one or more photons striking said second detector during the same time interval; and
   disposing a first filter between said first detector and said formation effective to cause Pe sensitivity to match standoff influence thereby compensating for both effects simultaneously.

2. The method of claim 1, wherein said Pe sensitivity is b/a and derived from the equation:

$$\log(N)=(a+b\times Pe)\times \rho_e+c$$

where:
   N is a total energy deposition measured in a detector;
   a is the density sensitivity;
   b/a is the Pe sensitivity, wherein b is determinable from the product: b/a×a;
   Pe is the photoelectric factor for the formation environment;
   $\rho_e$ is the electron density for the formation environment, and
   c is a normalization factor that depends on the source intensity.

3. The method of claim 2, wherein said first detector is a short space detector and said second detector is a long space detector and b/a is independently determined for said first detector and for said second detector.

4. The method of claim 3, wherein a ratio of Pe sensitivity is determined from the equation:

$$\text{slope}/(1+\text{slope})$$

wherein said slope is the slope of a universal rib in a standoff compensation.

5. The method of claim 4, wherein said γ-γ density tool is of a design such that $((b_{LS}/a'_{LS})/(b_{SS}/a'_{SS}))$ is about equal to (slope/(1+slope)).

6. The method of claim 5, wherein a value for $((b_{LS}/a'_{LS})/(b_{SS}/a'_{SS}))$ is adjusted by said first filter thickness.

7. The method of claim 6, wherein a second filter is disposed between said second detector and said formation.

8. The method of claim 7, wherein said value for $((b_{LS}/a'_{LS})/(b_{SS}/a'_{SS}))$ is adjusted by selection of said second filter thickness.

9. The method of claim 8, wherein at least a portion of said first filter thickness or said second filter thickness is a wall of said γ-γ density tool housing or other structural material.

10. The method of claim 4, wherein a value for (slope/(1+slope)) is adjusted by selection of at least one of said first distance, said second distance and said third distance.

11. The method of claim 10, wherein said energetic particles are Bremsstrahlung photons formed by said source impinging accelerated electrons on a target.

12. The method of claim 11, wherein said source is selected to be a betatron.

13. The method of claim 12, wherein a duty cycle of said betatron generates a burst of photons having a duration of from 0.5 μsecond to 3 μseconds.

14. The method of claim 3, including a further step of estimating, based on an average number of photons recorded at said second detector, an energy level below which single photon events are dominant.

15. The method of claim 14, wherein said average number of photons recorded at said second detector is between 0.1 per pulse and 3 per pulse.

16. The method of claim 15, wherein said average number of photons recorded at said second detector is approximately one per pulse.

17. The method of claim 15, including the further step of extracting said formation Pe factor from all photons recorded at or below said energy level below which single photon events are dominant.

18. The method of claim 15, wherein said estimating step includes a least square fitting calculation.

19. The method of claim 15, wherein said estimating step includes a spectrum inversion calculation.

20. The method of claim 1, wherein at least one of said first detector and said second detector is collimated and a collimation channel forms an angle relative to a longitudinal axis of said γ-γ density tool.

21. The method of claim 1, including providing a second short space detector spaced a fourth distance from said source wherein said fourth distance is less than said second distance.

22. The method of claim 1, wherein said first detector is a short space detector and said second detector is a long space detector and said second total energy pulses are separated into first total energy pulses that are statistical likely to have been generated by single photon events and second total energy pulses that are statistically likely to have been generated by multiple photon events.

23. The method of claim 22, wherein the total energy of said first total energy pulses have a lower total energy than said second total energy pulses.

24. The method of claim 23, wherein each said photon event in the first total energy pulse has a maximum energy of less than 200 keV.

25. The method of claim 24, wherein each said photon event in the first total energy pulse has a maximum energy of from 50 keV to 150 keV.

26. A method to compensate for the photoelectric effect in pulsed γ-γ density tools, comprising the steps of:
providing a source of energetic particles and directing those energetic particles at a formation having a known photoelectric factor and electron density;
capturing one or more photons either emitted or deflected from said formation with one of a first detector and a second detector, wherein said first detector is spaced a first distance from said source, said second detector is spaced a second distance from said source detector and a third distance separates said first detector from said second detector;
measuring a first total energy of said one or more photons striking said first detector during a time interval and measuring a second total energy of said one or more photons striking said second detector during the same time interval;
estimating, based on an average number of photons captured at said second detector, an energy level below which single photon events are dominant; and
calculating a mean energy for all single photon events.

27. The method of claim 26, wherein said estimating step includes a spectrum inversion calculation.

28. The method of claim 27, including wherein said spectrum inversion calculation includes the steps of:
calculating a scoring photon number distribution among $N_p$ pulses where $N_p$ is a number of x-ray pulses within a given duration;
normalizing said scoring photon number distribution; and
inverting a mean energy of all single photon events from said normalized scoring photon number distribution.

29. The method of claim 28, wherein said Pe sensitivity is b/a and derived from the equation:

$$\log(N) = (a + b \times Pe) \times \rho_e + c$$

where:
N is a total energy deposition measured in a detector;
a is the density sensitivity;
b/a is the Pe sensitivity, wherein b is determinable from the product: b/a×a;
Pe is the photoelectric factor for the formation environment;
$\rho_e$ is the electron density for the formation environment, and
c is a normalization factor.

30. The method of claim 29, wherein said first detector is a short space detector and said second detector is a long space detector and b/a is independently determined for said first detector and for said second detector.

31. The method of claim 30, including a step of calculating separate mean energies for double and higher photon events from said mean energy for all single photon events.

32. The method of claim 31, wherein said step of calculating mean energies for double and higher photon events utilizes the equation:

$$p_n(E) = \int p_1(E - E') p_{n-1}(E') dE' = \int_{E' \leq E} p_1(E - E') p_{n-1}(E') dE'$$

where n is from 2 to the highest probable photon event.

33. The method of claim 32, including the step of segmenting $p_n(E)$ into bins of constant probability thereby constructing a multi-photon distribution, where n is from 1 to the highest probable photon event.

34. The method of claim 33, where said $p_1(E)$ bin is used to estimate Pe.

35. A pulsed γ-γ density tool for borehole logging of formation density, comprising:
a tool housing defining an interior volume
a source of energetic particles having a duty cycle within said tool housing;
a first photon detector within said tool housing and spaced a first distance from said source;
a second photon detector within said tool housing and spaced a second distance from said source wherein said second detector is spaced a third distance from said first detector and said first distance is less than said second distance:
a first filter is disposed between said first detector and said formation, wherein a Pe sensitivity effect is about equal to a standoff density effect due to a combination that includes one or more of said first filter thickness, said first filter composition, said first distance, said second distance and said third distance.

36. The pulsed γ-γ density tool of claim 35, wherein a second filter is disposed between said second detector and said formation.

37. The pulsed γ-γ density tool of claim 36, wherein said housing is a portion of at least one of said first filter and said second filter.

38. The pulsed γ-γ density tool of claim 37, wherein at least one of said first detector and said second detector is collimated by a collimation channel having an angle of other than 90° relative to a longitudinal axis of said tool.

39. The pulsed γ-γ density tool of claim 36, wherein said first filter and said second filter are formed from a material where thickness variation has a limited effect on photon absorption.

40. The pulsed γ-γ density tool of claim 39, wherein said first filter and said second filter are independently selected from the group consisting of iron and stainless steel.

41. The pulsed γ-γ density tool of claim 40, wherein said first filter and said second filter each have a thickness of between 0.25 cm and 0.75 cm.

42. The pulsed γ-γ density tool of claim 36, wherein said source of energetic particles is a betatron.

43. The pulsed γ-γ density tool of claim 42, wherein said betatron has a pulse duration of from 0.5 μsecond to 3 μseconds.

44. The pulsed γ-γ density tool of claim 36, wherein said second detector has an energy window of from 0 to 150 keV.

45. The pulsed γ-γ density tool of claim 44, wherein said second detector has an energy window of from 50 keV to 150 keV.

46. The pulsed γ-γ density tool of claim 36, wherein a third detector is spaced a fourth distance from said source and said fourth distance is greater than said first distance and less than said second distance.

* * * * *